United States Patent
Sjöberg et al.

(10) Patent No.: US 10,306,245 B2
(45) Date of Patent: May 28, 2019

(54) PICTURE ORDER COUNT ALIGNMENT IN SCALABLE VIDEO

(71) Applicant: Telefonaktiebolaget L M Ericsson (publ), Stockholm (SE)

(72) Inventors: Rickard Sjöberg, Stockholm (SE); Jonatan Samuelsson, Stockholm (SE); Ruoyang Yu, Solna (SE)

(73) Assignee: TELEFONAKTIEBOLAGET L M ERICSSON (PUBL), Stockholm (SE)

( * ) Notice: Subject to any disclaimer, the term of this patent is extended or adjusted under 35 U.S.C. 154(b) by 176 days.

(21) Appl. No.: 14/786,116

(22) PCT Filed: Jun. 25, 2014

(86) PCT No.: PCT/SE2014/050783
§ 371 (c)(1),
(2) Date: Oct. 21, 2015

(87) PCT Pub. No.: WO2015/057124
PCT Pub. Date: Apr. 23, 2015

(65) Prior Publication Data
US 2016/0088306 A1 Mar. 24, 2016

Related U.S. Application Data

(60) Provisional application No. 61/890,449, filed on Oct. 14, 2013.

(51) Int. Cl.
*H04N 19/00* (2014.01)
*H04N 19/30* (2014.01)
(Continued)

(52) U.S. Cl.
CPC ............ *H04N 19/30* (2014.11); *H04N 19/187* (2014.11); *H04N 19/31* (2014.11); *H04N 19/33* (2014.11);
(Continued)

(58) Field of Classification Search
CPC ........ H04N 19/30; H04N 19/44; H04N 19/46; H04N 19/70
(Continued)

(56) References Cited

U.S. PATENT DOCUMENTS 9,532,052 B2 12/2016 Chen et al.
2014/0301439 A1* 10/2014 Chen .................. H04N 19/70
375/240.02

FOREIGN PATENT DOCUMENTS

CN 1051222814 A 12/2015

OTHER PUBLICATIONS

International Search Report and Written Opinion of the International Searching Authority, Application No. PCT/SE2014/050783, dated Sep. 11, 2014.
(Continued)

*Primary Examiner* — Jeffrey A Williams
(74) *Attorney, Agent, or Firm* — Sage Patent Group

(57) ABSTRACT

A POC recalculation value is retrieved by a decoder from an encoded representation of a RAP picture in a base layer of a video stream comprising pictures in multiple layers. POC values of reference pictures in a DPB of the decoder are recalculated using the POC recalculation value. By signaling the POC recalculation value in the RAP picture, which enables the decoder to correctly handle video streams with non-aligned RAP pictures.

28 Claims, 16 Drawing Sheets

(51) Int. Cl.
　　*H04N 19/597*　　(2014.01)
　　*H04N 19/503*　　(2014.01)
　　*H04N 19/70*　　(2014.01)
　　*H04N 19/46*　　(2014.01)
　　*H04N 19/593*　　(2014.01)
　　*H04N 19/33*　　(2014.01)
　　*H04N 19/31*　　(2014.01)
　　*H04N 19/187*　　(2014.01)
　　*H04N 19/423*　　(2014.01)
　　*H04N 19/44*　　(2014.01)

(52) U.S. Cl.
　　CPC ........... *H04N 19/423* (2014.11); *H04N 19/44* (2014.11); *H04N 19/46* (2014.11); *H04N 19/503* (2014.11); *H04N 19/593* (2014.11); *H04N 19/597* (2014.11); *H04N 19/70* (2014.11)

(58) Field of Classification Search
　　USPC .................................................... 375/240.02
　　See application file for complete search history.

(56) References Cited

OTHER PUBLICATIONS

Chen et al., "High efficiency video coding (HEVC) scalable extension draft 3" (Document: JCTVC-N1008_v3), Joint Collaborative Team on Video Coding (JCT-VC) of ITU-T SG 16 WP 3 and ISO/IEC JTC 1/SC 29/WG 11; 14$^{th}$ Meeting: Vienna, AT, Jul. 25-Aug. 2, 2013, 64 pp.

Ericsson/Sjöberg et al., "HLS: Error robust POC alignment" (Document: JCTVC-O0176 m30941), Joint Collaborative Team on Video Coding (JCT-VC) of ITU-T SG 16 WP 3 and ISO/IEC JTC 1/SC 29/WG 11; 15$^{th}$ Meeting: Geneva, CH, Oct. 23-Nov. 1, 2013 (Saved Oct. 15, 2013), 5 pp.

Ericsson/Sjöberg et al., "HLS: Error robust POC alignment" (Document: JCTVC-O0176v3 m30941), Joint Collaborative Team on Video Coding (JCT-VC) of ITU-T SG 16 WP 3 and ISO/IEC JTC 1/SC 29/WG 11; 15$^{th}$ Meeting: Geneva, CH, Oct. 23-Nov. 1, 2013 (Saved Oct. 28, 2013), 8 pp.

International Telecommunication Union "Series H: Audiovisual and Multimedia Systems Infrastructure of audiovisual services—Coding of moving video—High efficiency video coding", ITU-T Recommendation H.265, Apr. 2013, 317 pp.

Qualcomm Incorporated/Chen et al., "MV-HEVC/SHVC HLS: Cross-layer POC alignment" (Document: JCTVC-N0244), Joint Collaborative Team on Video Coding (JCT-VC) of ITU-T SG 16 WP 3 and ISO/IEC JTC 1/SC 29/WG 11; 14$^{th}$ Meeting: Vienna, AT, Jul. 25-Aug. 2, 2013 (Saved: Jul. 15, 2013), 4 pp.

First Office Action dated Jun. 8, 2018, Chinese Patent Application No. 201480056364.X, 2 pages.

* cited by examiner

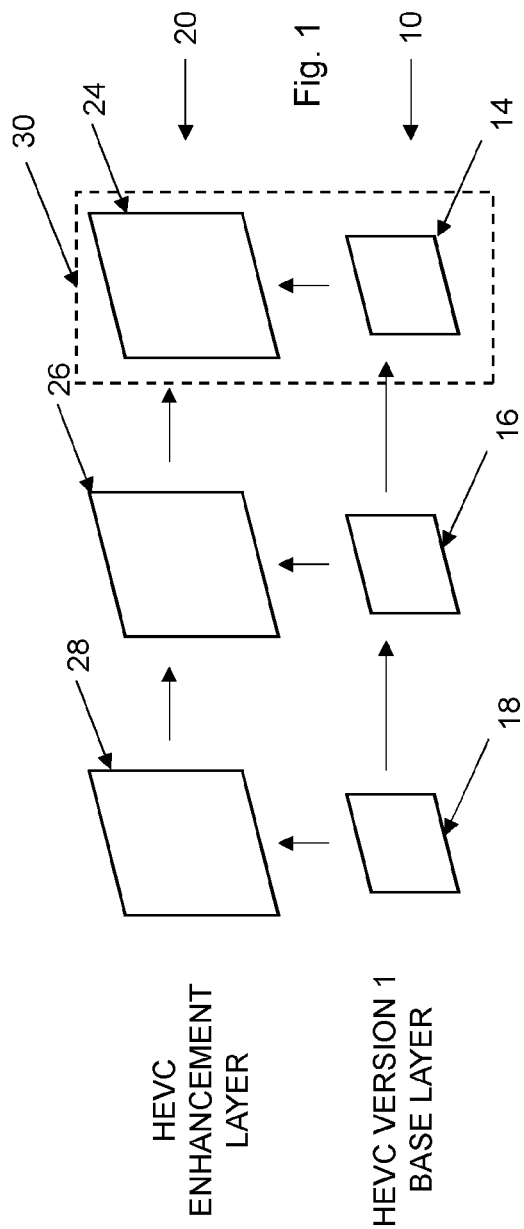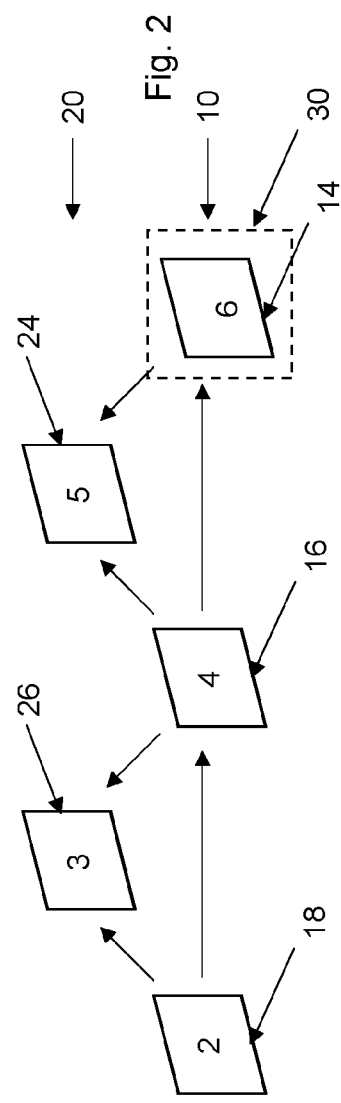

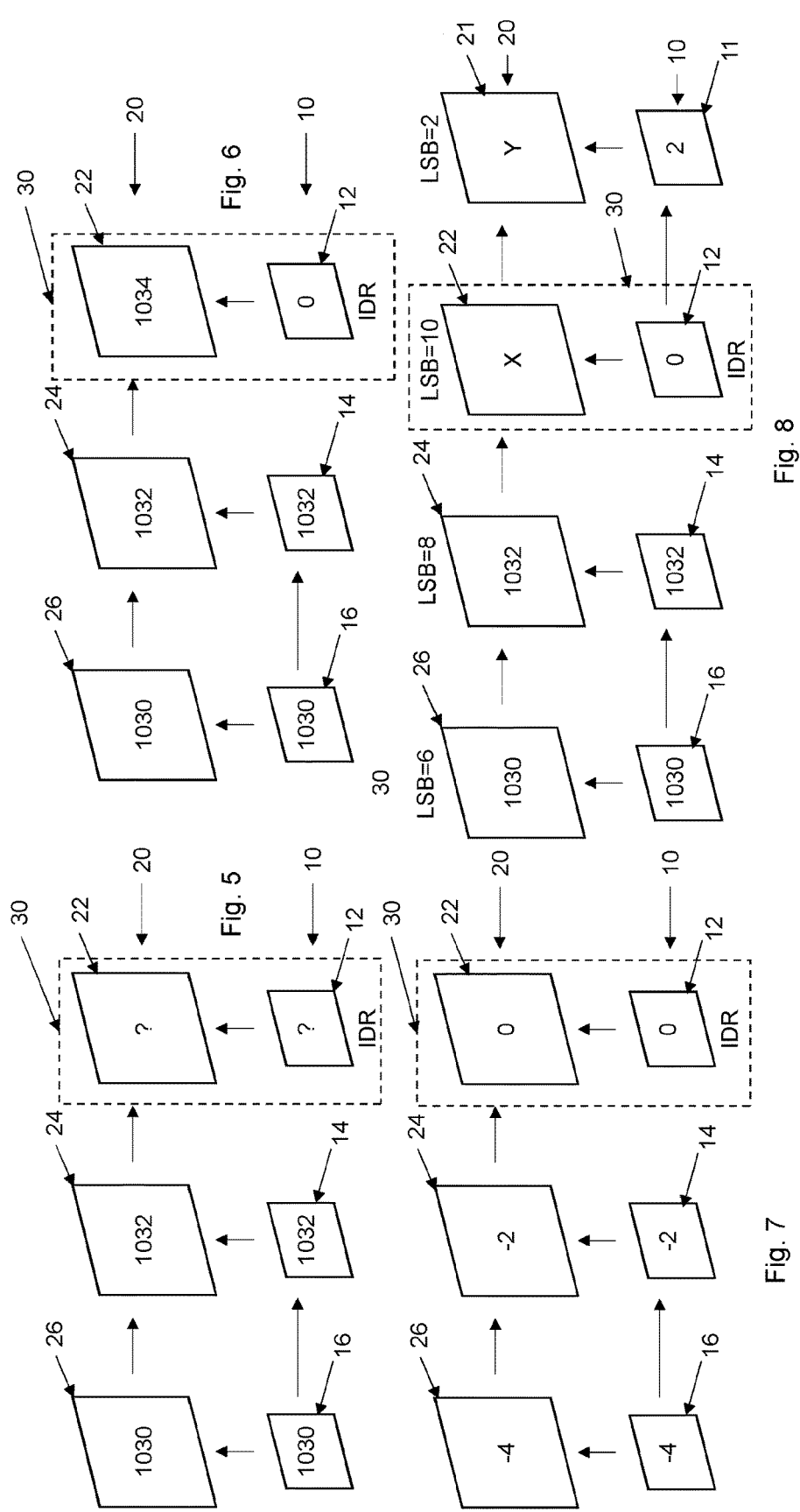

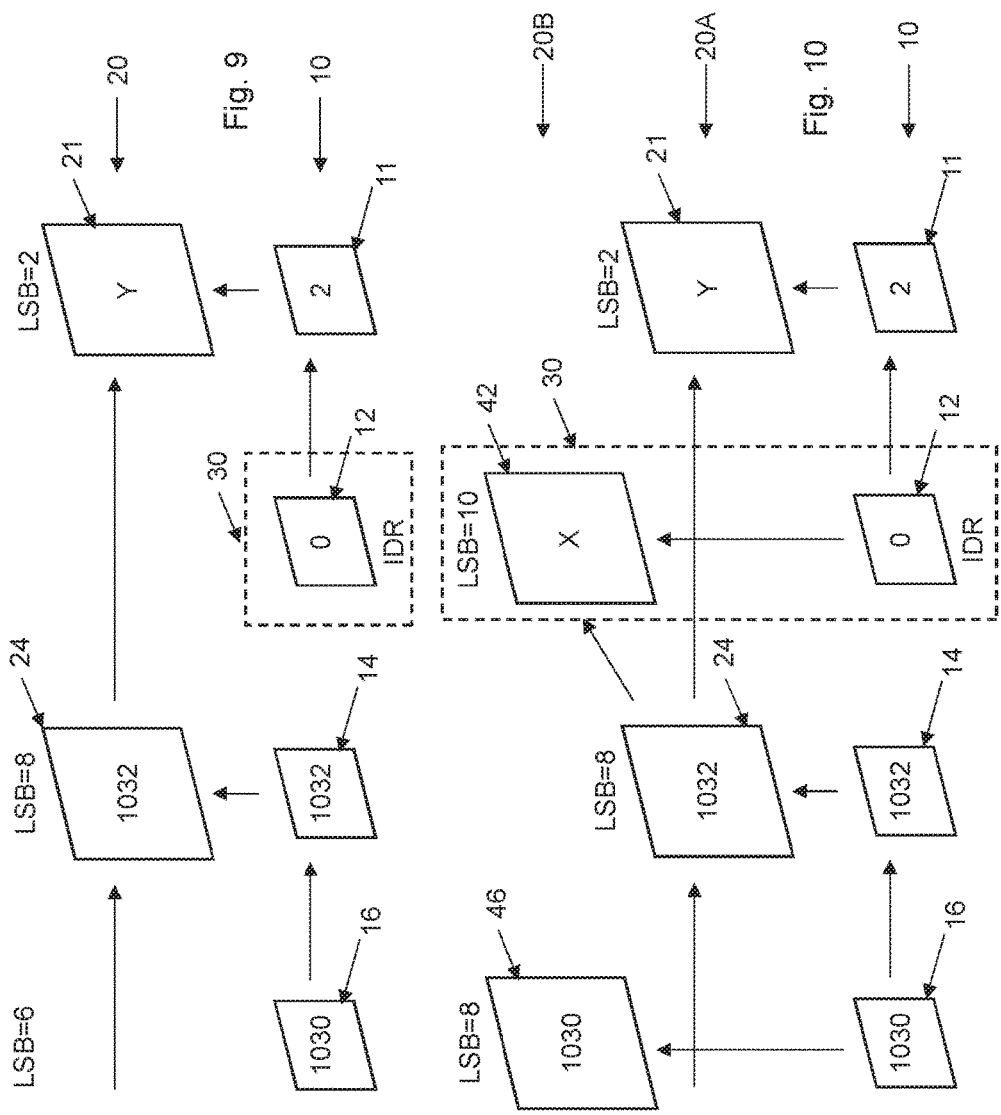

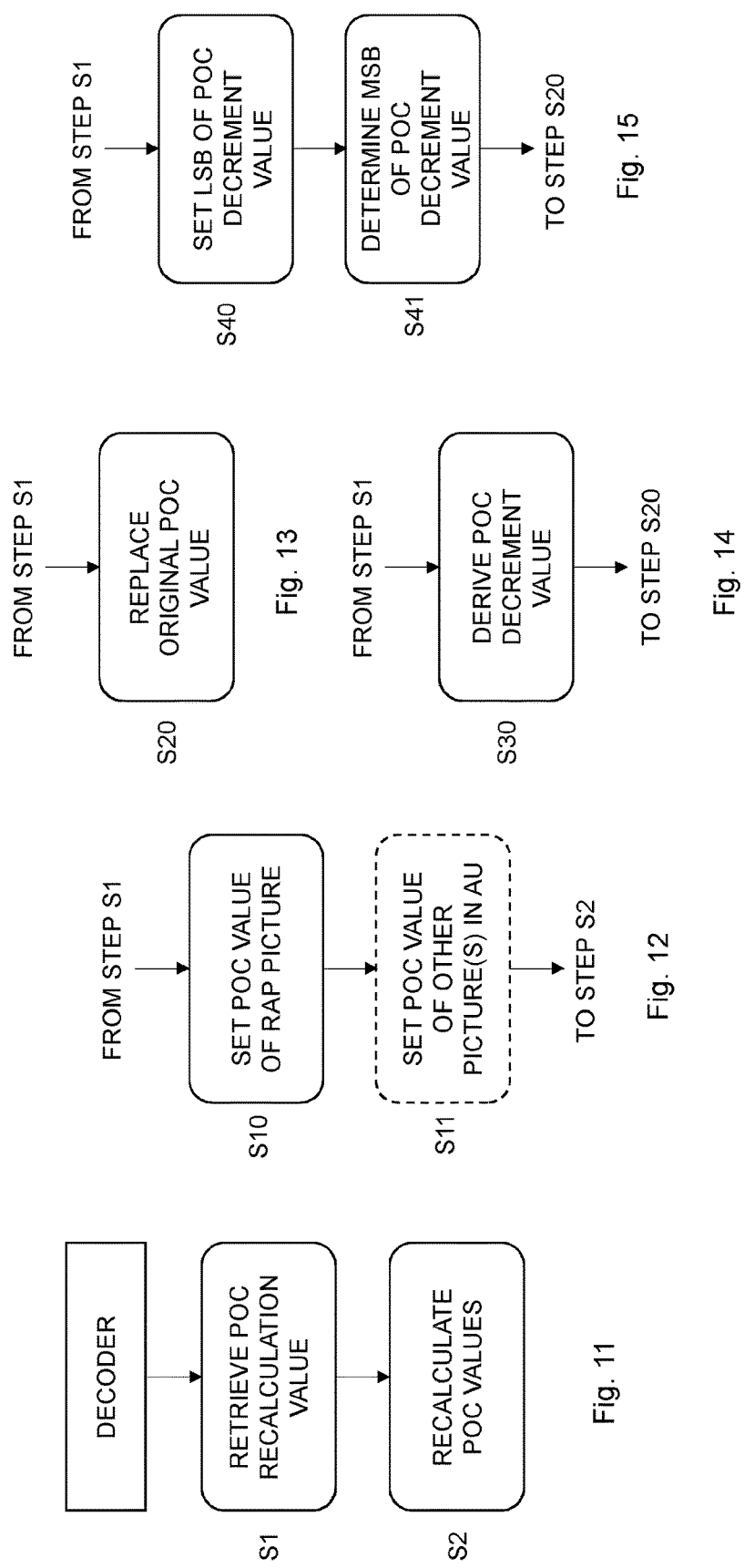

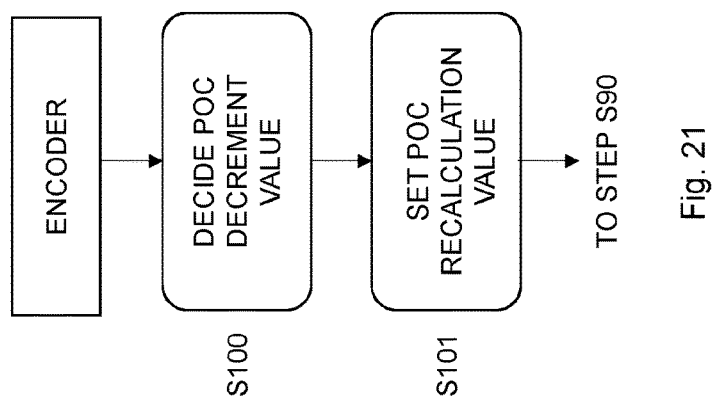
Fig. 21
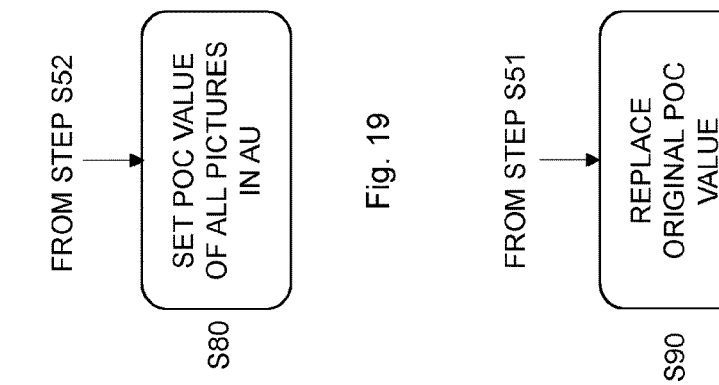
Fig. 19
Fig. 20
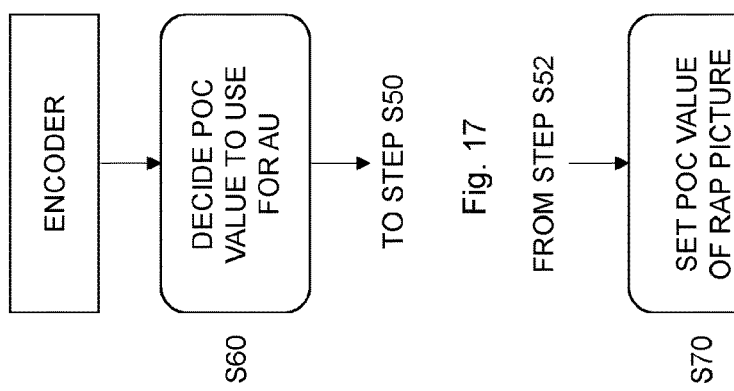
Fig. 17
Fig. 18
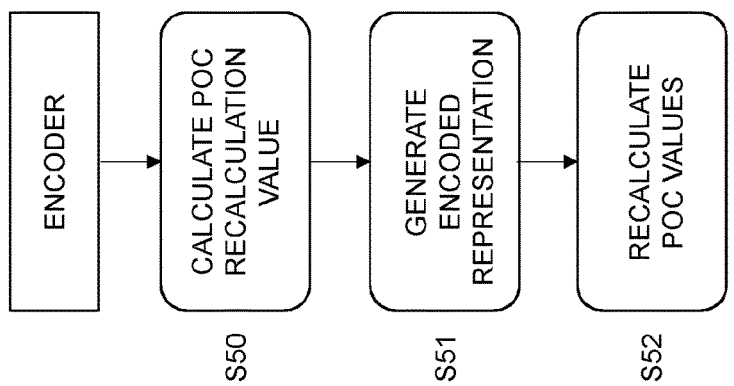
Fig. 16

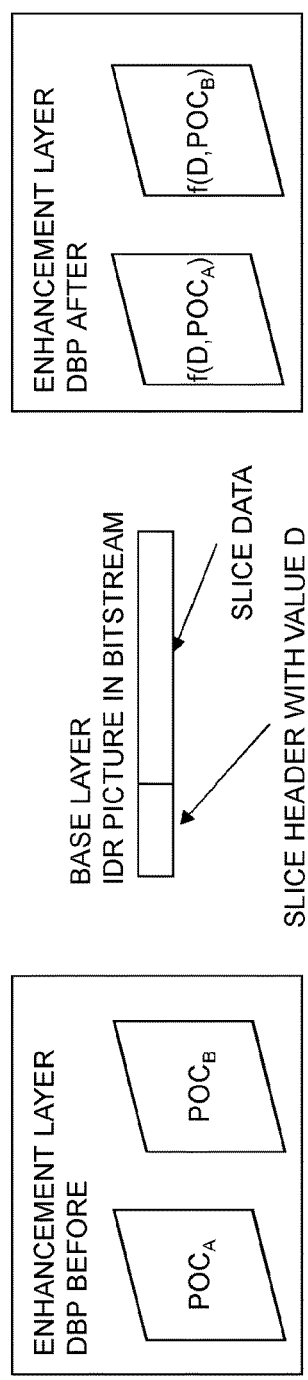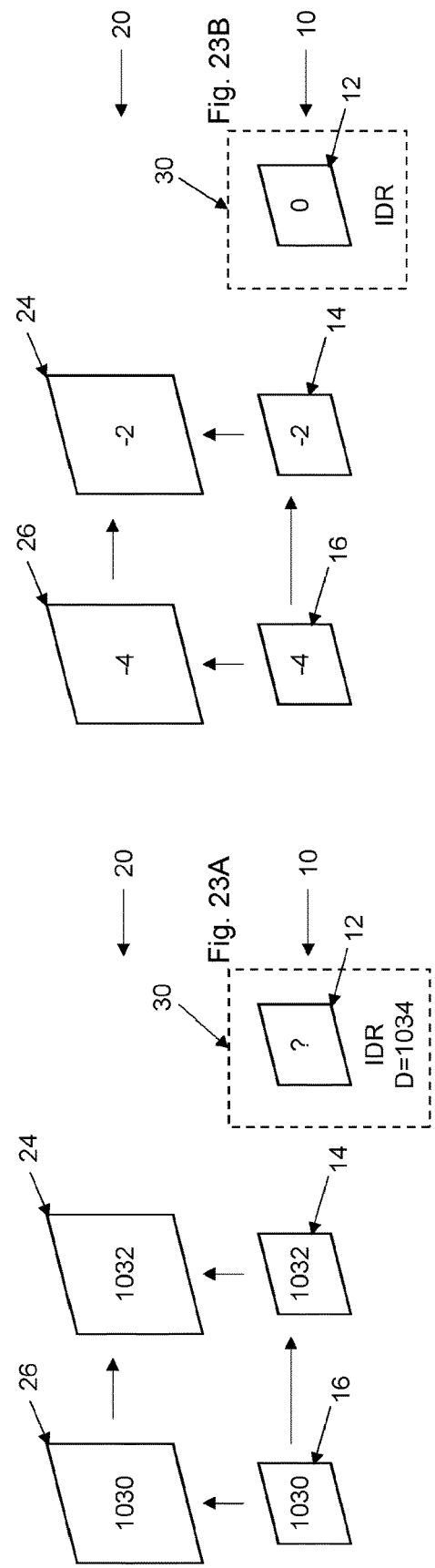
Fig. 22
Fig. 23A
Fig. 23B

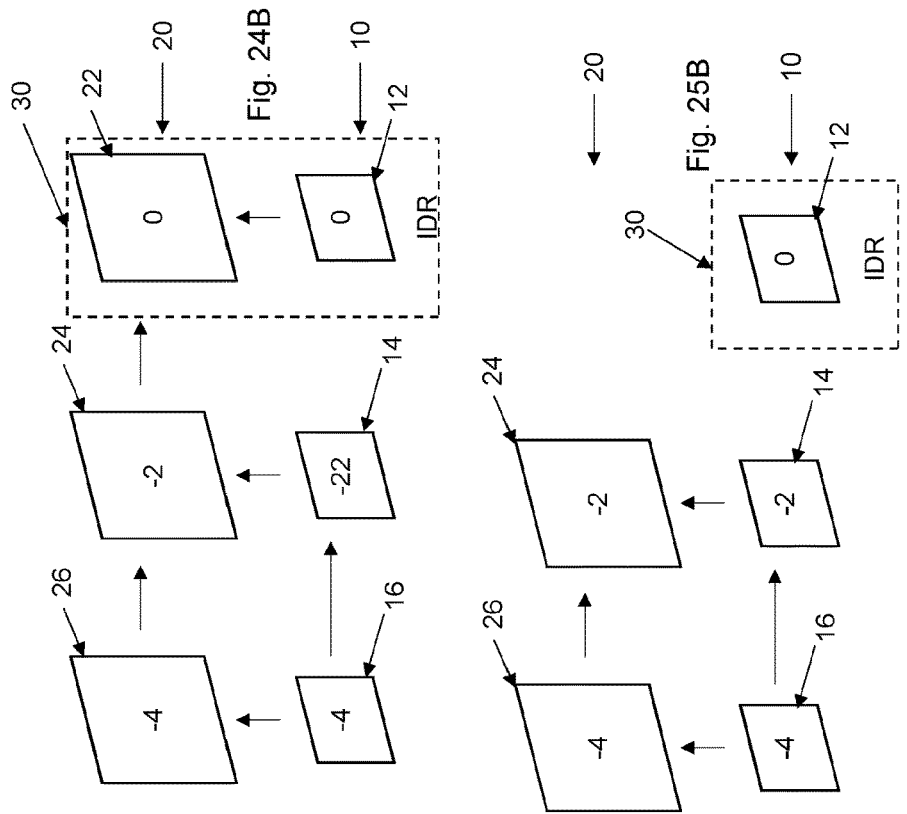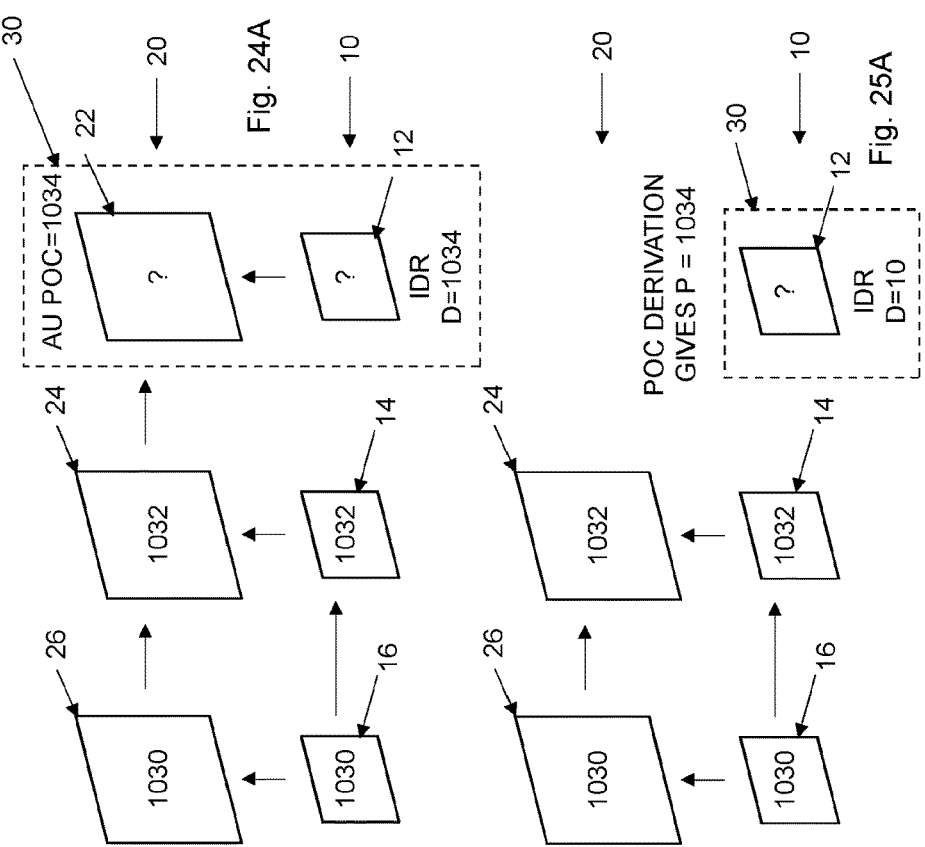

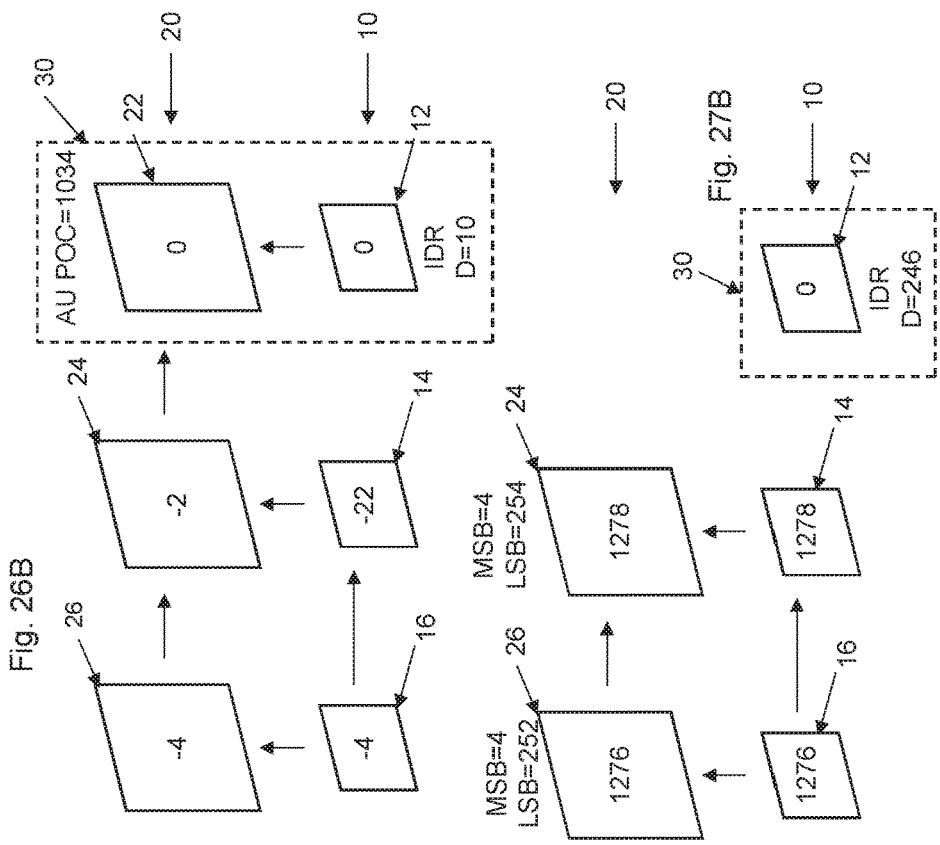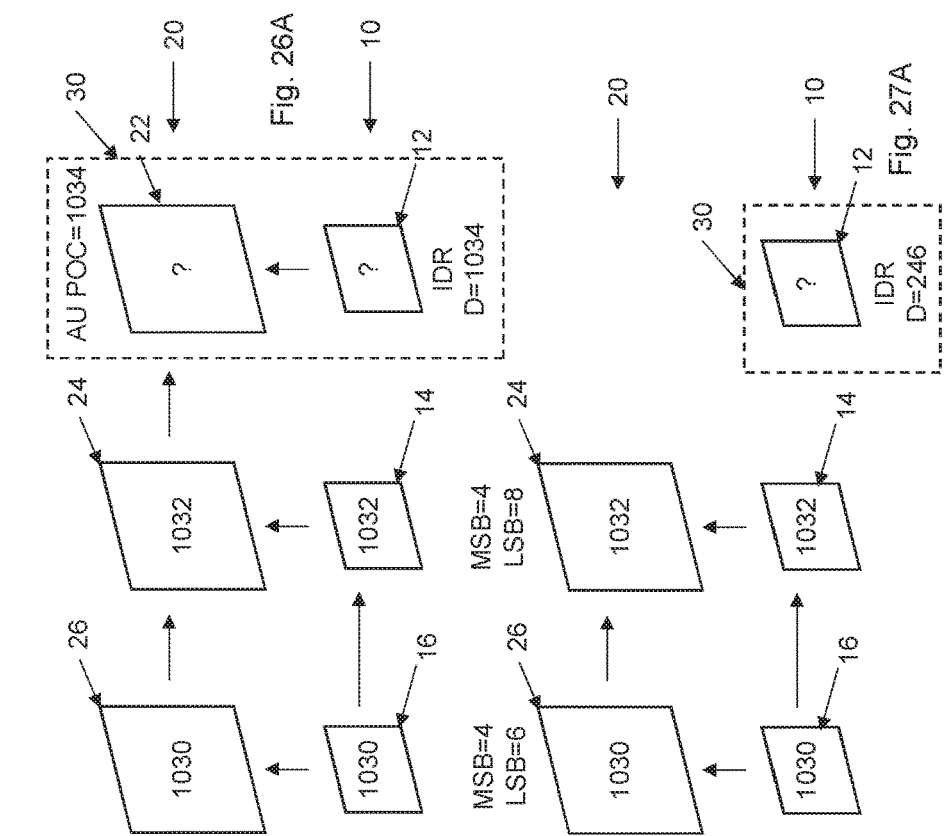

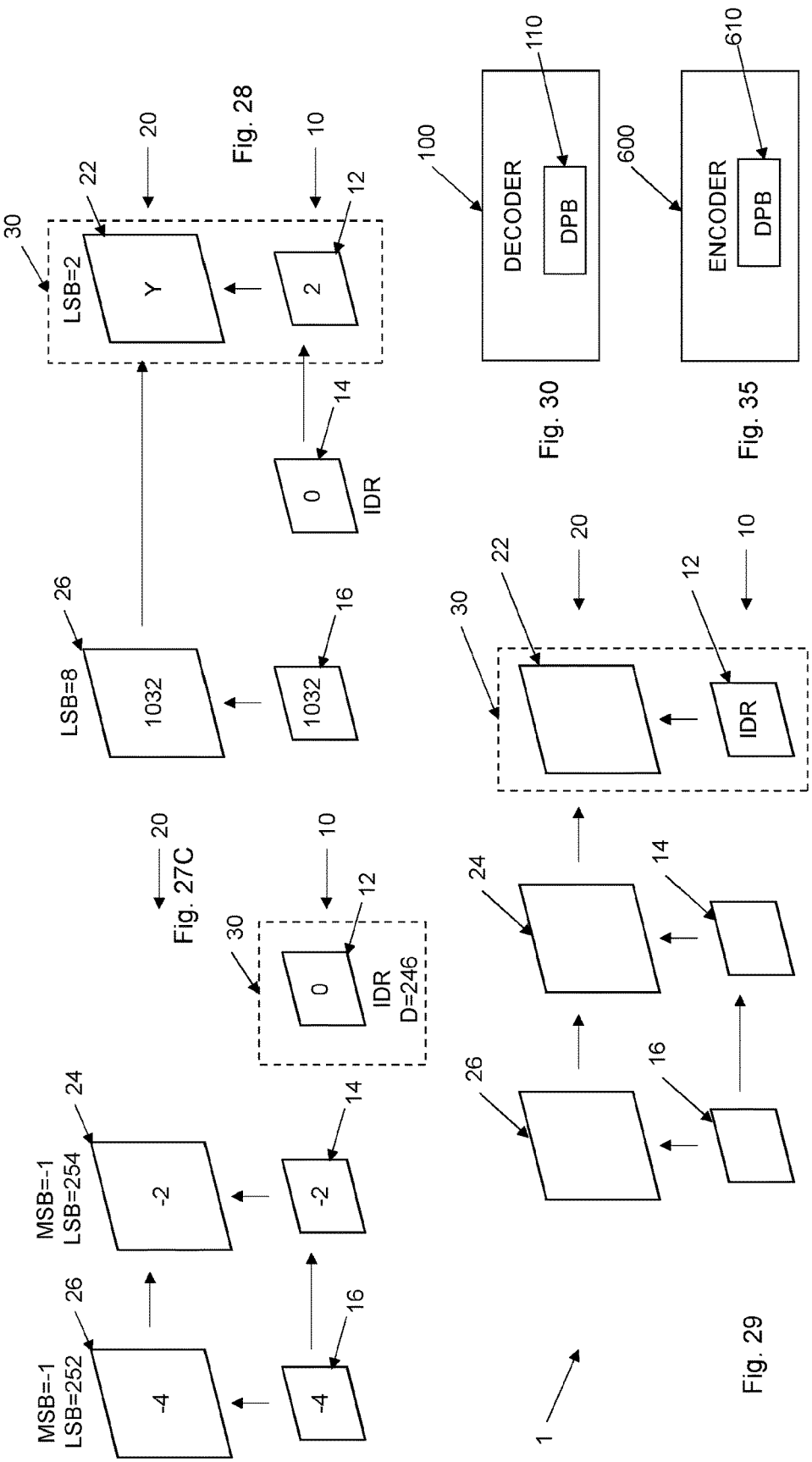

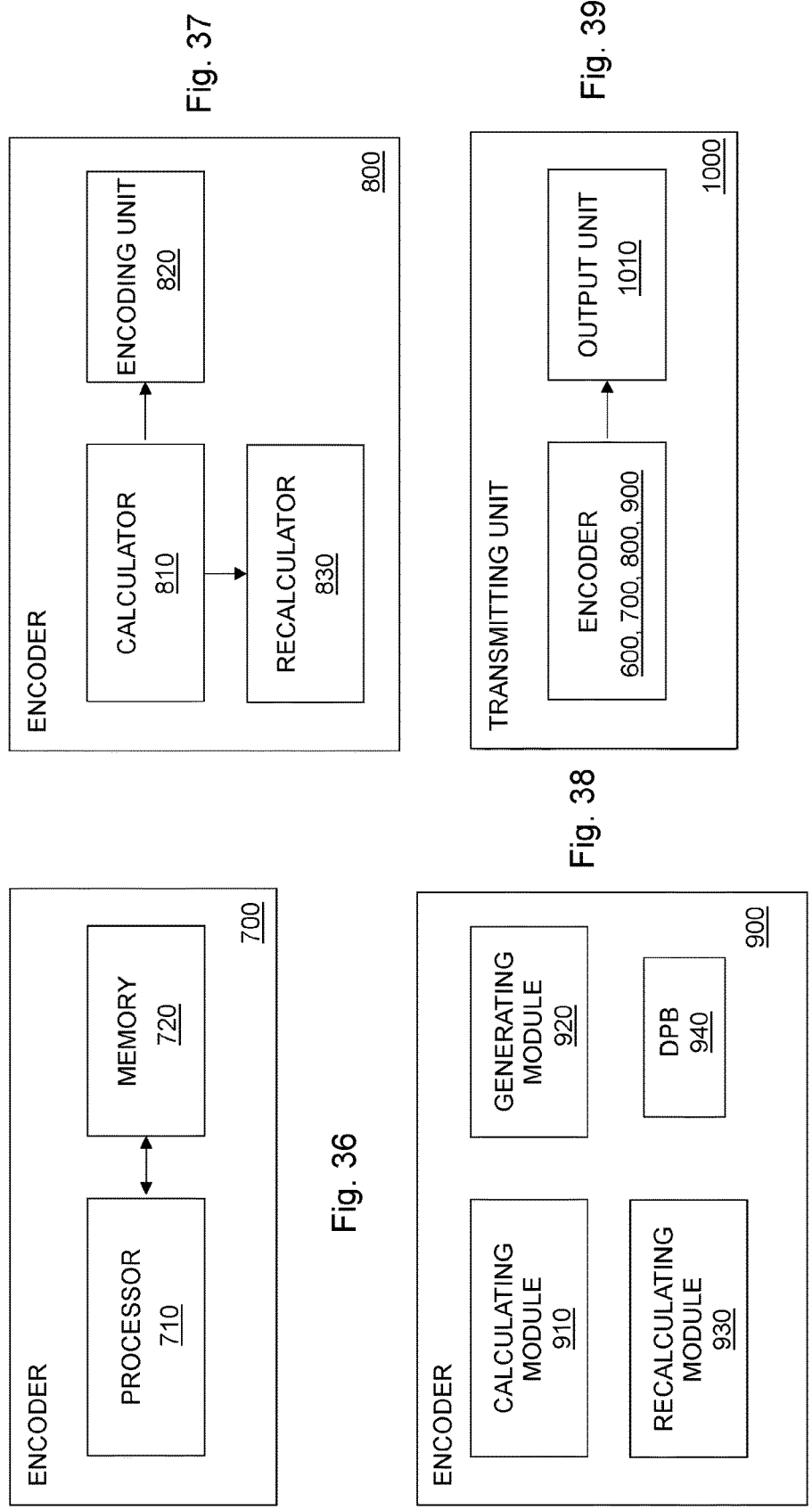

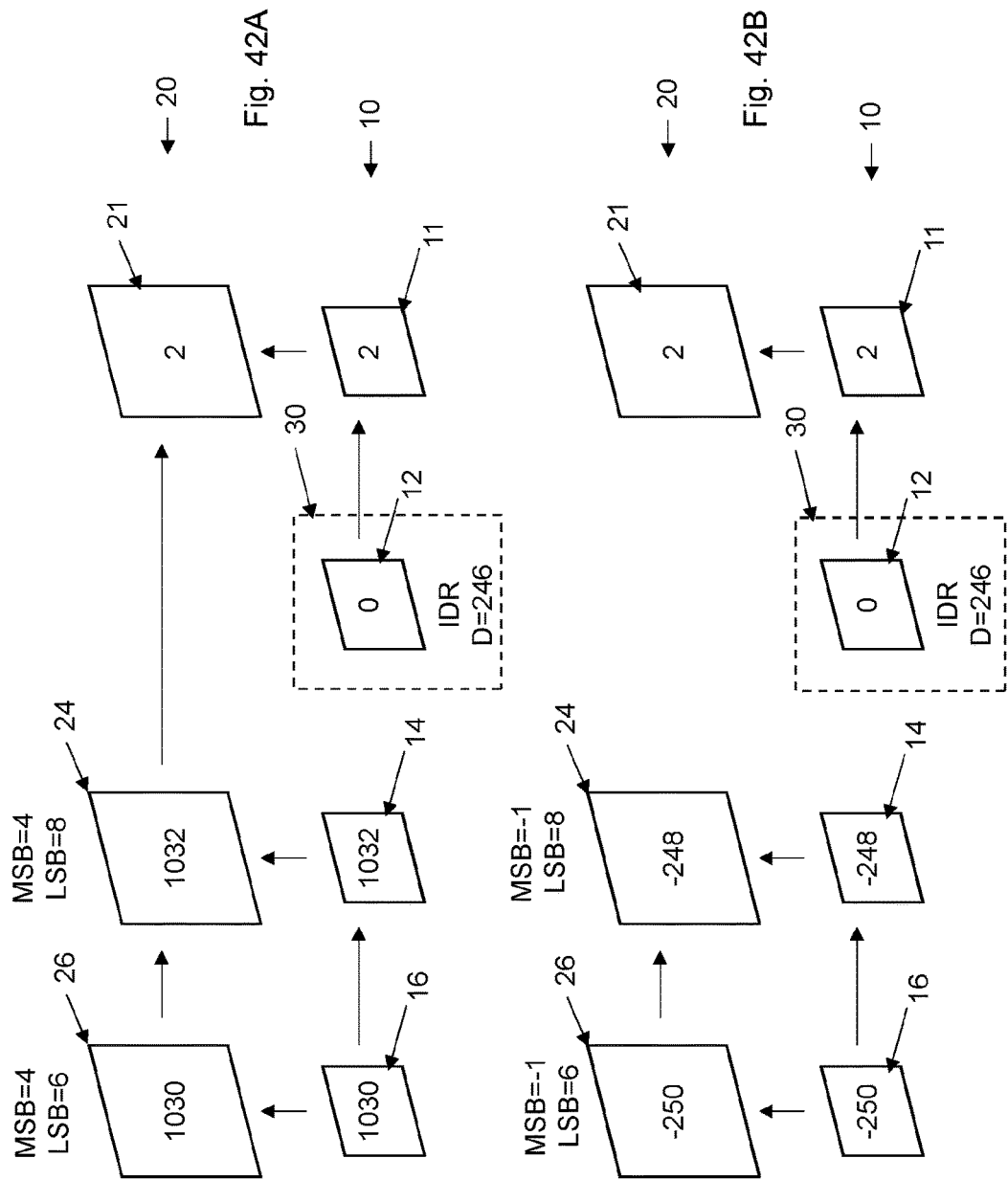

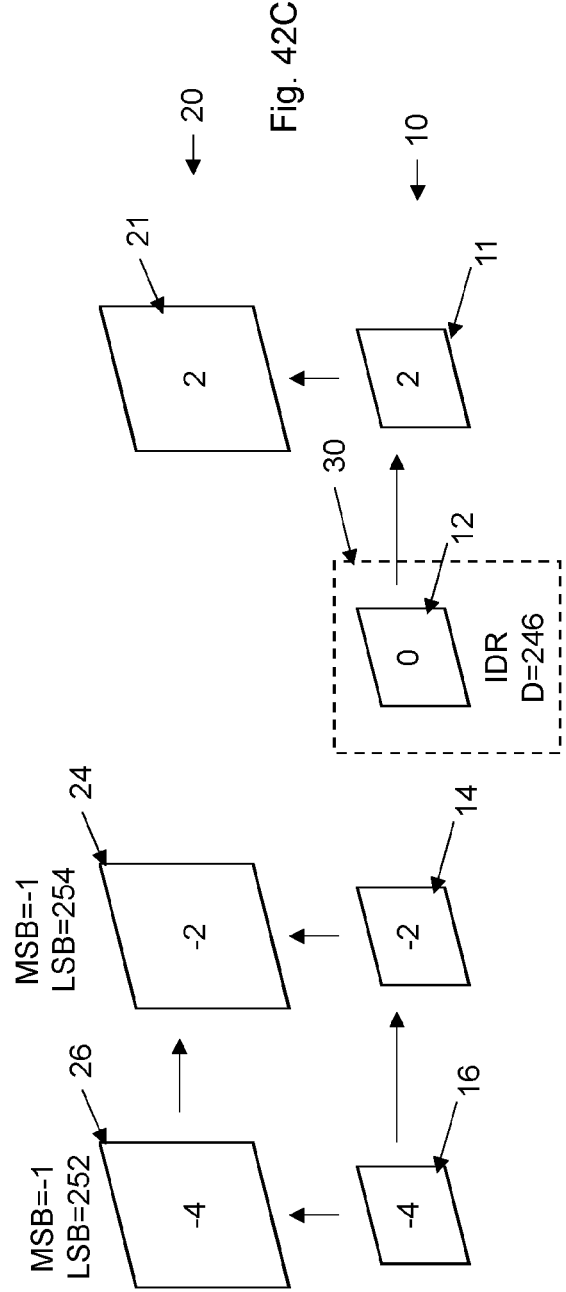

PICTURE ORDER COUNT ALIGNMENT IN SCALABLE VIDEO

CROSS REFERENCE TO RELATED APPLICATIONS

This application is a 35 U.S.C. § 371 national stage application of PCT International Application No. PCT/SE2014/050783, filed on Jun. 25, 2014, which itself claims priority to U.S. provisional Application No. 61/890,449, filed Oct. 14, 2013, the disclosure and content of both of which are incorporated by reference herein in their entirety. The above-referenced PCT International Application was published in the English language as International Publication No. WO 2015/057124 A1 on Apr. 23, 2014.

TECHNICAL FIELD

The embodiments generally relate to the field of encoding and decoding pictures of a video stream, and in particular to video streams comprising pictures in multiple layers.

BACKGROUND

The High Efficiency Video Coding (HEVC) video coding standard [1] is currently in the process of being extended to support scalable layers. The plans include spatial, quality, and multiview scalable extensions in which bitstreams contain a base layer and a variable number of enhancement layers. The most recent draft version of the HEVC scalable extension was JCTVC-N1008_v3 [2].

The base layer in a scalable stream complies with the first version of HEVC which does not include any scalable extensions. The enhancement layers in the scalable stream are marked as extension data using types that were defined as reserved in the first version of HEVC. In the HEVC specification the type is indicated using high level signaling and is carried in the Network Abstraction Layer (NAL) unit type. It was in the first version specified that first version decoders, i.e. decoders compliant with the first version of HEVC, will discard data marked with extension types. This enables legacy or first version decoders to correctly decode the base layer in scalable bitstreams while ignoring the enhancement layers. Decoders compliant to an extension of HEVC will recognize the extension data types and be able to also decode the enhancement layers in the scalable bitstream.

Example picture structures using scalability are often illustrated as shown in FIG. 1. The figure illustrates spatial scalability with a lower resolution base layer 10 with three pictures 14, 16, 18 and a higher resolution enhancement layer with three pictures 24, 26, 28. The arrows in the figure show how the pictures reference each other. As you can see, the enhancement layer pictures 24, 26, 28 use the base layer pictures 14, 16, 18 for reference. Since no enhancement layer picture 24, 26, 28 is used for reference by a base layer picture 14, 16, 18, the enhancement layer 20 can be removed, which would result in a first version bitstream (version one bitstream) that would be decodable by a first version decoder (version one decoder). FIG. 1 contains three time instances, for which there are two pictures 14, 24; 16, 26; 18, 28 each, one base layer picture and one enhancement layer picture. These pictures 14, 24; 16, 26; 18, 28 are grouped and called access units (AUs) 30. There are three access units 30 in FIG. 1, of which one is marked with reference signs in order to simplify the figure.

The first version of HEVC is actually somewhat scalable as well since it includes temporal layers. This is illustrated in FIG. 2, which shows three pictures 14, 16, 18 in temporal layer 0 (pictures 2, 4, and 6) 10 and two pictures 24, 26 in temporal layer 1 (pictures 3 and 5) 20. Similar to the spatial scalability example, temporal layer 1 20 can be discarded. In this example the result is a bitstream with half the frame rate. There are five access units 30 in FIG. 2, of which one is marked with reference sign.

A bitstream in which one or more higher layers have been removed is called a subbitstream, regardless whether the higher layer is a temporal layer or a regular layer.

An important rule in HEVC regarding all types of scalability is that no picture of a lower layer is allowed to use a picture of a higher layer for reference. This rule is important as it preserves decodeability for bitstreams in which higher layers have been removed. Another important rule is that if an encoder outputs a scalable bitstream, the encoder is responsible that every possible subbitstream is a compliant bitstream. This means that a network node or any other entity can blindly discard any higher layer combination from a scalable bitstream and be assured that the output is a compliant bitstream. This rule is generally denoted the compliance rule.

Every picture in HEVC has a picture order count (POC) value assigned to it. This value defines the order in which pictures are output; pictures are always output in increasing POC order. Output of pictures from a decoded picture buffer (DPB) is typically output for display on a screen. However, output as used herein also encompass output for other purposes than display including, but not limited to, output for storage on a memory, output for transcoding, etc.

The range of allowed POC values is from $-2^{31}$ to $2^{31}-1$, so in order to save bits in the slice header, only the least significant bits (LSB) of the POC (POC lsb) are signaled. This is done by the slice_pic_order_cnt_lsb codeword in HEVC. The number of bits to use for POC lsb is signaled in the sequence parameter set (SPS) using the codeword log 2_max_pic_order_cnt_lsb_minus4 and can be between 4 and 16. Since only the POC lsb is signaled in the slice header, the most significant bits (MSB) of the POC (POC msb) for the current picture are derived from the POC of previous pictures and the POC lsb of the current picture. HEVC defines the derivation of the most significant POC bits in equation 8-1 in section 8.3.1 of the HEVC standard [1].

The HEVC standard specifies a number of picture types that have different characteristics. An important set of picture types are the Intra random access point (IRAP) picture types. Those are intra coded pictures that provide random access points in a bitstream.

IRAP pictures in a scalable bitstream can either be aligned or non-aligned. This can be signaled in JOTVC-N1008_v3 [2] using the video parameter set (VPS) codeword cross_layer_irap_aligned_flag, see section F.7.4.3.1.1 in [2]. If this flag is 1 and one of the pictures in an access unit is an IRAP picture, all pictures in that access unit must be IRAP pictures of the same IRAP type. If cross_layer_irap_aligned_flag is set to 0 in the VPS, IRAP pictures are not required to be aligned and the picture structure shown in FIG. 3 is allowed.

An IRAP picture in the base layer provides a point where it is possible to start decoding. An IRAP picture in an enhancement layer provides a point where it is possible to start decoding that layer given that the layer(s) below is(are) being decoded. If IRAP pictures are aligned, the access unit containing IRAP pictures in all layers provide a point where it is possible to start decoding any number of layers.

If IRAP pictures are non-aligned, such as the pictures in FIG. 3, the process from making a random access in the base layer until a certain number of enhancement layers are being decoded is called the layer-wise startup process. The process can be summarized like this:
1 Before decoding, no layer is considered initialized.
2 When an IRAP picture is encountered in a base layer, that layer is immediately considered initialized.
3 When an IRAP picture is encountered in an enhancement layer, that layer is considered initialized if all layers that the enhancement layer is dependent on are initialized.
4 When a non-IRAP picture is encountered, that picture is decoded if it belongs to an initialized layer and discarded if it belongs to an uninitialized layer.

The layer-wise startup process would decode the grey pictures in FIG. 3. Note that IRAP pictures in enhancement layers may reference pictures in lower layers while IRAP pictures in the base layer are not allowed to reference any other picture.

There are three types of IRAP pictures in HEVC, the instantaneous decoding refresh (IDR), clean random access (CRA), and broken link access (BLA) types.

An IDR picture in the base layer is an intra picture that refreshes the decoder. This means that neither the IDR picture nor any base layer picture that follows the IDR picture in the bitstream can have any dependency to any picture that precedes the IDR picture in the bitstream. There is no codeword (POC lsb) signaled for base layer IDR pictures in HEVC, instead the POC is set equal to 0.

The base layer CRA picture is an intra picture that in contrast to the IDR picture does not refresh the decoder. This allows for base layer pictures later in the bitstream to depend on base layer pictures before the CRA picture in the bitstream. These pictures that precede the CRA picture in output order are called leading pictures and are not allowed to be displayed after the CRA picture, only before. All leading pictures in HEVC must be identifiable by using special picture types.

Besides using a base layer CRA picture for random access it is also possible to use the CRA picture for splicing video streams where a particular base layer IRAP picture in the middle of a bitstream and all subsequent pictures are replaced by a base layer CRA picture with its subsequent pictures from another bitstream, see FIG. 4. Since the base layer CRA picture may have leading pictures, which become undecodable when the CRA picture is used for splicing, the HEVC standard has defined the BLA picture type to use for CRA splicing. During splicing the CRA picture is simply re-typed as a BLA picture, see FIG. 4. The BLA picture type instructs the decoder to discard the leading pictures, and this makes splicing work. Another alternative would have been to remove the leading pictures during splicing but then system buffer parameters would need to be recalculated since data has been removed.

POC lsb is signaled for every picture in HEVC except the IDR picture type, for this IRAP picture type the POC is set to 0. The POC msb is set to 0 for BLA pictures but the POC lsb are present in the BLA slice header and the POC of the BLA picture is set equal to the POC lsb. The POC for CRA pictures is calculated as described above using POC lsb and POC msb.

A very important rule in HEVC is that the POC of every picture in the same access unit must be identical. This rule makes it easy to detect access unit boundaries; as soon as the POC of two pictures are different they belong to different access units and it makes it easier to detect picture losses. This rule is generally referred to as the POC alignment rule.

Another rule regarding BLA and IDR pictures is that they reset the decoder. Among other things this flushes the decoder and forces all picture that have not yet been output to be output. Note that CRA pictures do not flush the decoder. This rule is generally referred to as the IRAP output rule.

Another rule regarding POC values is that the current picture and all its short-term reference pictures must be within a certain POC range which is half of the maximum value of POC lsb. If POC lsb is coded using 8 bits, the maximum value is $2^8-1=255$ and the allowed POC range is $255/2=127$. This rule is generally referred to as the POC range rule.

The POC alignment rule and the rule that IDR pictures always have POC equal to zero poses a problem that is solved by the poc_reset_flag in JCTVC-N1008_v3, see section F.7.4.7.1 in [2]. The problem is illustrated in FIG. 5, where the POC value of each picture 12, 14, 16, 22, 24, 26 is shown inside each picture (the following figures in this document also show their POC values inside each picture). Only one of the pictures 12 is an IRAP picture, this is the IDR picture in FIG. 5, all other pictures 14, 16, 22, 24, 26 are non-IRAP pictures. Assume now that the encoder has encoded a lot of pictures so the last POC is 1032. Remember that only the POC lsb is signaled in the slice header and if we assume that 8 bits are used to signal POC lsb, the last POC was signaled by the value 1032%256=8, while the POC msb of 1032−8=1024 was derived. Now the encoder wants to put an IDR picture 12 in the base layer 10 without making any enhancement layer picture 22 in the same access unit 30 IRAP.

The IDR picture 12 sets the POC to 0, and the POC alignment rule says that all pictures 12, 22 in the same access unit 30 must have the same POC value. This means that both pictures 12, 22 in the access unit 30 containing the IDR picture 12 must have POC equal to 0. One problem here is that the enhancement layer picture 22 uses the picture 24 in the enhancement layer 20 with POC equal to 1032 for reference and this would violate the POC range rule given that picture 24 with POC 1032 is a short-term picture (1032−0>127). Another problem is that if the POC is set to 0 for the enhancement layer picture 22, that picture 22 gets a lower POC than the picture 24 with POC 1032, which would indicate that the enhancement layer picture 22 should be output before the picture 24 with POC 1032. This is not a problem for the base layer 10 due to the IRAP output rule but it is a problem for the enhancement layer picture 22.

The poc_reset_flag in JCTVC-N1008_v3 [2] solves this problem. The poc_reset_flag is a flag in the slice header of enhancement layer pictures that has the following effect on the decoder:
 a) The POC is derived normally, deriving the POC msb and using the POC lsb as signaled in the slice header.
 b) Then, the POC of every reference picture is decremented by the derived POC value.
 c) Finally, the POC of the enhancement layer picture is set equal to 0.

Signaling a POC lsb of 10 (POC=POC msb+POC lsb=1024+10=1034) for the enhancement layer picture 22 of the access unit 30 containing the IDR picture 12 would result in the POC numbers shown in FIG. 6 after step a has taken place and FIG. 7 shows the POC numbers after steps a, b, and c have taken place. In practice not all pictures shown with negative POC values are still reference pictures at the time steps a, b, and c are carried out in this example, but here we assume that they are.

As you can see, FIG. 7 shows that the problem of POC range and output are both solved by the poc_reset_flag. For instance, the correct output order is maintained and first a picture 16, 26 with POC=−4 is output prior to a picture 14, 24 with POC=−2 and finally a picture 12, 22 with POC=0. The POC range is also correct since 0-(−2)=−2-(−4)=2<127. The poc_reset_flag is sent in the slice header extension part of HEVC. This is a part of the HEVC slice header that will be ignored by legacy or first version HEVC decoders.

There are, however, a number of problems with the existing solution in terms of error resilience problem, non-existing picture problem, temporal layer problem and bit cost problem.

The Error Resilience Problem

Consider the video stream shown in FIG. 8. If picture X 22 is lost during transmission, chances are that the POC of picture Y 21 is calculated based on the picture 24 with POC 1032. It would then get POC equal to 1026 (POC msb=1024 and POC lsb=2). Since the poc_reset_flag is carried in picture X 22, which is lost, no recalculation of POC values are done. The loss of picture X 22 therefore causes the following problems:

Picture Y 21 gets POC 1026, which violates the POC alignment rule (1026≠2).

Picture Y 21 gets POC 1026, which is lower than 1032, and the relative output order is incorrect.

If poc_reset_flag would have been received, POC 1032 would have been recalculated to −2. The POC of picture Y 21 would be 2 and therefore the reference picture set (RPS) of picture Y 21 would use a delta POC of −4 to indicate the reference picture. But POC of picture Y 21 is equal to 1026, which would specify a reference picture with POC 1022, which is incorrect.

The Non-Existing Picture Problem

Consider the video stream shown in FIG. 9. If the enhancement layer 20 has half the frame rate of the base layer 10, there is no corresponding picture to the IDR picture 12. This means that the POC cannot be reset in the enhancement layer 10 and the picture structure as shown in FIG. 9 is not possible.

The reason for not having an enhancement layer picture at the IDR picture is that a smaller maximum size of any access unit is desirable and the IDR access unit becomes smaller when there are no enhancement layer pictures there. A solution that would support this structure would be better than to forbid the shown picture structure.

The Temporal Layer Problem

Consider the video stream shown in FIG. 10. Here the enhancement layer consists of two temporal layers 20A, 20B to provide temporal scalability and picture X 42 is put in a higher temporal layer 20B. This is well if all pictures are received. However, if a node removes temporal layer 1 20A in the enhancement layer, the decoder faces the non-existing picture problem. Therefore, the picture structure in FIG. 10 is actually forbidden according to the prior art, which limits the encoder flexibility.

The Bit Cost Problem

Further, the current approach mandates that one bit in each slice header is used to signal poc_reset_flag. A more cost-effective solution is desired.

Thus, there is room for improvements with regard to scalable bitstreams, in which a video stream comprises pictures in multiple co-called layers.

SUMMARY

It is a general objective to provide an efficient picture order count (POC) determination in a decoder and an encoder.

It is a particular embodiment to provide an efficient POC management for a video stream comprising non-aligned random access point pictures.

These and other objectives are met by embodiments as disclosed herein.

An aspect of the embodiments relates to a method performed by a decoder. The method comprises retrieving a POC recalculation value from an encoded representation of a random access point picture in a base layer of a video stream comprising pictures in multiple layers. The method also comprises recalculating POC values of reference pictures in a decoded picture buffer of the decoder using the POC recalculation value.

Another aspect of the embodiments relates to a decoder configured to retrieve a POC recalculation value from an encoded representation of a random access point picture in a base layer of a video stream comprising pictures in multiple layers. The decoder is also configured to recalculate POC values of reference pictures in a decoded picture buffer of the decoder using the POC recalculation value.

A related aspect of the embodiments defines a decoder comprising a retrieving module for retrieving a POC recalculation value from an encoded representation of a random access point picture in a base layer of a video stream comprising pictures in multiple layers. The decoder also comprises a recalculating module for recalculating POC values of reference pictures in a decoded picture buffer of the decoder using the POC recalculation value.

A further aspect of the embodiments relates to a receiving unit comprising an input unit configured to receive a bitstream and a decoder as defined above.

Another aspect of the embodiments relates to a method performed by an encoder. The method comprises calculating a POC recalculation value based on a POC value to use for an access unit comprising a random access point picture in a base layer of a video stream comprising pictures in multiple layers. The method also comprises generating an encoded representation of the random access point picture comprising the POC recalculation value. The method further comprises recalculating POC values of reference pictures in a decoded picture buffer of the encoder using the POC recalculation value.

A further aspect of the embodiments relates to an encoder. The encoder is configured to calculate a POC recalculation value based on a POC value to use for an access unit comprising a random access point picture in a base layer of a video stream comprising pictures in multiple layers. The encoder is also configured to generate an encoded representation of the random access point picture comprising the POC recalculation value. The encoder is further configured to recalculate POC values of reference pictures in a decoded picture buffer of the encoder using the POC recalculation value.

A related aspect of the embodiments defines an encoder comprising a calculating module for calculating a POC recalculation value based on a POC value to use for an access unit comprising a random access point picture in a base layer of a video stream comprising pictures in multiple layers. The encoder also comprises a generating module for generating an encoded representation of the random access point picture comprising the POC recalculation value. The encoder further comprises a recalculating module for recalculating POC values of reference pictures in a decoded picture buffer of the encoder using the POC recalculation value.

A further aspect of the embodiments relates to a transmitting module comprising an encoder as defined above and an output unit configured to send a bitstream.

Yet another aspect of the embodiments relates to a network node comprising a receiving unit as defined above and/or a transmitting unit as defined above.

A further aspect of the embodiments relates to a computer program comprising instructions which, when executed on at least one processor, cause the at least one processor to retrieve a POC recalculation value from an encoded representation of a random access point picture in a base layer of a video stream comprising pictures in multiple layers. The at least one processor is also caused to recalculate POC values of reference pictures in a decoded picture buffer of the decoder using the POC recalculation value.

Still another aspect of the embodiments relates to a computer program comprising instructions which, when executed on at least one processor, cause the at least one processor to calculate a POC recalculation value based on a POC value to use for an access unit comprising a random access point picture in a base layer of a video stream comprising pictures in multiple layers. The at least one processor is also caused to generate an encoded representation of the random access point picture comprising the POC recalculation value. The at least one processor is further caused to recalculate POC values of reference pictures in a decoded picture buffer of the encoder using the POC recalculation value.

A related aspect of the embodiments defines a carrier comprising a computer program as defined above. The carrier is one of an electronic signal, an optical signal, an electromagnetic signal, a magnetic signal, an electric signal, a radio signal, a microwave signal, or a computer-readable storage medium.

The present embodiments provide an efficient solution to handling POC values for a video stream comprising non-aligned random access point pictures. The embodiments signal the POC recalculation value in a random access point picture. As a consequence, embodiments as disclosed herein solve the prior art problems with regard to, for instance, at least one of the error resilience problem, non-existing picture problem, temporal layer problem and bit cost problem.

BRIEF DESCRIPTION OF THE DRAWINGS

The embodiments, together with further objects and advantages thereof, may best be understood by making reference to the following description taken together with the accompanying drawings, in which:

FIG. 1 is an example of a video stream with spatial scalable picture structure;

FIG. 2 is an example of a video stream with temporal scalable picture structure;

FIG. 5 is an example of a video stream with a non-aligned IRAP picture in the base layer;

FIG. 6 is an example of a video stream after deriving POC values;

FIG. 7 is an example of the video stream in FIG. 6 after deriving POC values, decrementing POC values and setting POC of the enhancement layer picture to 0;

FIG. 8 is an example of a video stream illustrating an error resilience problem;

FIG. 9 is an example of a video stream illustrating a non-existing picture problem;

FIG. 10 is an example of a video stream illustrating a temporal layer problem;

FIG. 11 is a flow chart illustrating a method performed by a decoder according to an embodiment;

FIG. 12 is a flow chart illustrating additional, optional steps of the method in FIG. 11;

FIG. 13 is a flow chart illustrating an additional, optional step of the method in FIG. 11;

FIG. 14 is a flow chart illustrating an additional, optional step of the method in FIG. 13;

FIG. 15 is a flow chart illustrating additional, optional steps of the method in FIG. 13;

FIG. 16 is a flow chart illustrating a method performed by an encoder according to an embodiment;

FIG. 17 is a flow chart illustrating an additional, optional step of the method in FIG. 16;

FIG. 18 is a flow chart illustrating an additional, optional step of the method in FIG. 16;

FIG. 19 is a flow chart illustrating an additional, optional step of the method in FIG. 16;

FIG. 20 is a flow chart illustrating an embodiment of the recalculating step of the method in FIG. 16;

FIG. 21 is a flow chart illustrating an embodiment of the calculating step of the method in FIG. 16;

FIG. 22 schematically illustrates updating POC of pictures in enhancement layer DPBs when a base layer IDR is received;

FIGS. 23A and 23B illustrate a decoder example after step a and step c of Embodiment 2;

FIGS. 24A and 24B is an example with a non-aligned IRAP picture in the base layer after step a, b and c and step a, b, c, d, e of Embodiment 2;

FIGS. 25A and 25B illustrate a decoder example after step b and step d of Embodiment 3;

FIGS. 26A and 26B illustrate an encoder example after step b and step e of Embodiment 3;

FIGS. 27A-27C is an example with a non-aligned IRAP picture in the base layer after step a, step b and adding D and step C of Embodiment 4;

FIG. 28 is an example of Embodiment 7;

FIG. 29 schematically illustrates an example of a video stream of multiple layers;

FIG. 30 illustrates an embodiment of a decoder;

FIG. 35 illustrates an embodiment of an encoder;

FIG. 36 illustrates another embodiment of an encoder;

FIG. 37 illustrates a further embodiment of an encoder;

FIG. 38 illustrates yet another embodiment of an encoder;

FIG. 39 illustrates an embodiment of a transmitting unit;

FIGS. 42A-42C is an example with a non-aligned IRAP picture in the base layer after step b, step c and step d of Embodiment 8.

DETAILED DESCRIPTION

Figure 3:
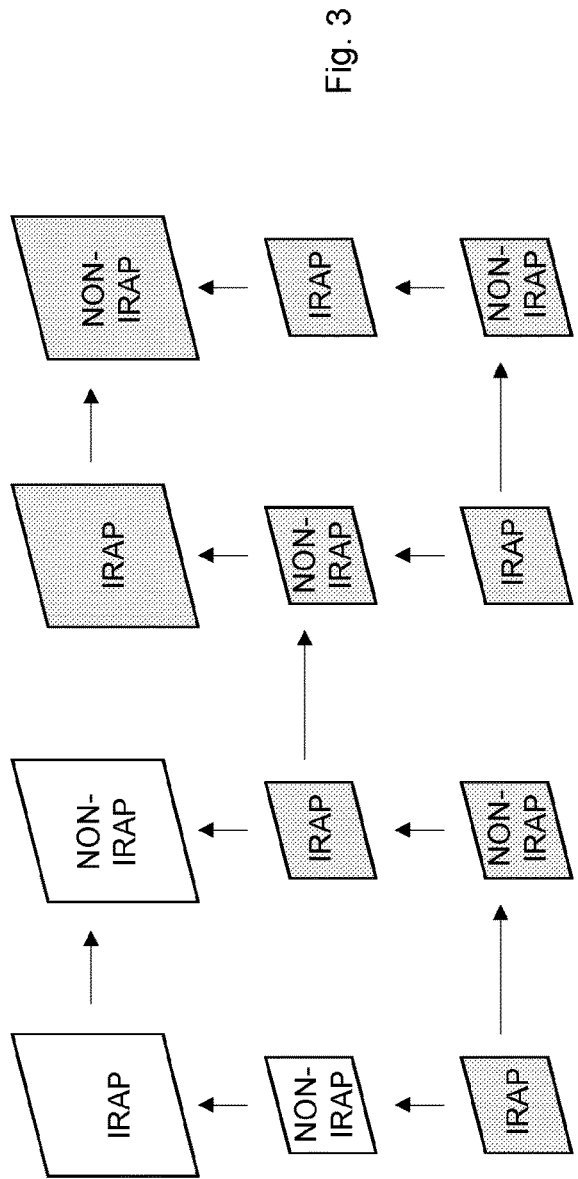
FIG. 3 is an example of a video stream with non-aligned IRAP pictures.
Figure 4:
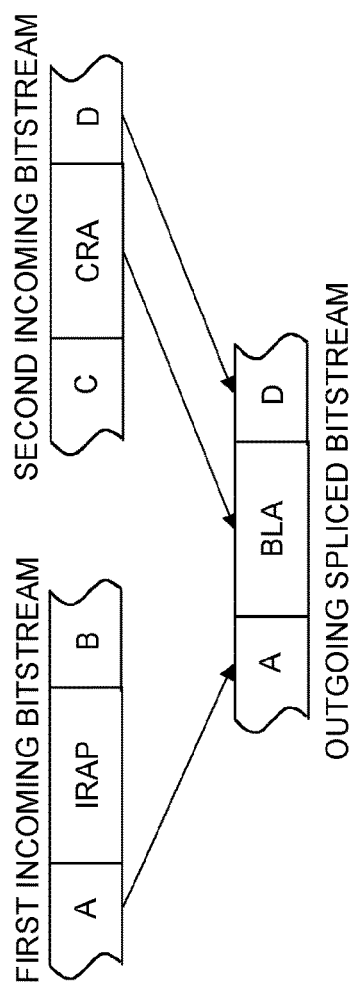
FIG. 4 schematically illustrates splicing bitstreams.

Throughout the drawings, the same reference numbers are used for similar or corresponding elements.

The embodiments generally relate to the field of encoding and decoding pictures of a video stream, and in particular to video streams comprising pictures in multiple layers. The embodiments furthermore solve at least some of the problems of the prior art solutions mentioned in the background section by signaling a recalculation value in a random access point picture in a base layer of the video stream, e.g. in the slice header of a base layer IDR picture. The recalculation value is used for recalculating the POC values for reference pictures.

With reference to FIGS. 11 and 29, an aspect of the embodiments relates to a method performed by a decoder. The method comprises retrieving, in step S1 of FIG. 11, a picture order count (POC) recalculation value from an encoded representation of a random access point picture 12 in a base layer 10 of a video stream 1 comprising pictures 12, 14, 16, 22, 24, 26 in multiple layers 10, 20. A next step S2 comprises recalculating POC values of reference pictures 24 stored in a decoded picture buffer (DPB) of the decoder using the POC recalculation value.

Thus, the embodiments use information signaled in a random access point picture 12 in a base layer 10 of the video stream 1 to recalculate POC values of reference pictures 24 in the DPB, i.e. pictures stored in the DPB and that are used as reference when decoding other pictures 22 of the video stream 1. In FIG. 29, the picture 24 is a reference picture present in the DPB for a next picture 22 of the enhancement layer 22. This next picture 22 further uses the random access picture 12 as reference picture.

A POC of a picture 12, 14, 16, 22, 24, 26 is a variable that is associated with each picture 12, 14, 16, 22, 24, 26 and uniquely identifies the associated picture 12, 14, 16, 22, 24, 26 among other pictures. When the associated picture 12, 14, 16, 22, 24, 26 is to be output from the decoded picture buffer, POC indicates the position of the associated picture 12, 14, 16, 22, 24, 26 in output order relative to the output order positions of the other pictures to be output from the decoded picture buffer.

A decoded picture buffer (DPB) is a buffer or memory holding decoded pictures for reference, output reordering or output delay. The decoded picture buffer contains picture storage buffers. Each of the picture storage buffers may contain a decoded picture that is marked as "used for reference" and/or is held for future output. Both the decoder and the encoder has access to a respective version of the decoded picture buffer.

A random access point picture 12 is an intra coded picture that provides a random access point in the video stream. Hence, decoding of pictures 12 in a layer 10 of the video stream 1 can be started at such a random access point.

The video stream 1 as shown in FIG. 29 comprises multiple, i.e. at least two, layers 10, 20 of pictures 12, 14, 16, 22, 24, 26. Layer as used herein refers to any scalable layer or view that comprises pictures 12, 14, 16, 22, 24, 26 of the video stream 1. Non-limiting but illustrative example of layers include spatial layers, quality layers, temporal layers, etc. of scalable video but also views of multiview video. In scalable video one of the layers 12 is the base layer 12, which does not include any scalable extensions and can thereby be decoded without reference to any pictures 22, 24, 26 in other layers 20. The same applies for multiview video in which one of the views is referred to as the base view, which is regarded as a base layer herein. Other layers 20 or views of the video stream 1 are referred to as enhancement layers herein and are typically decoded at least partly based on pictures 12, 14, 16 in the base layer 10 and/or pictures in lower layers of the video stream 1.

The recalculation of POC values of reference pictures 24 in the DPB in step S2 thereby means that the original POC values of the reference pictures 24, which are calculated as discussed in the background section using the syntax element or codeword slice_pic_order_cnt_lsb defining the least significant bits of the POC value and most significant bits derived from the POC of previous picture and slice_pic_order_cnt_lsb, are replaced by updated POC values obtained using the POC recalculation value.

In an embodiment, step S1 comprises retrieving the POC recalculation value from a slice header of a random access point picture 12. In another embodiment, step S1 comprises retrieving the POC recalculation value from an instantaneous decoding refresh (IDR) picture 12 in the base layer 10. A preferred embodiment of step S1 comprises retrieving the POC recalculation value from a slice header of an IDR picture 12 in the base layer 10.

Thus, the random access point picture 12 signaling the POC recalculation value is preferably an IDR picture 12 as preferred type of random access point picture. This further means that in an embodiment, the POC recalculation value is typically not present in any slice header of other types of random access point pictures, such as clean random access (CRA) pictures and broken link access (BLA) pictures. In another embodiment, the POC recalculation value could alternatively or additionally be signaled in CRA pictures and/or BLA pictures, such as in slice headers of CRA pictures and/or BLA pictures.

Retrieving the POC recalculation value from the slice header of the, preferably, IDR picture preferably involves parsing and decoding the slice header to obtain the POC recalculation value in step S1.

FIG. 12 is a flow chart illustrating additional, optional steps of the method shown in FIG. 11 according to various embodiments. The method continues from step S1 in FIG. 11. A next step S10 comprises setting a POC value of the random access point (RAP) picture 12 in the base layer to 0 (zero). Thus, in a preferred embodiment the POC value of the random access point picture 12, preferably IDR picture 12, is set to a predefined value of 0. This further means that no syntax element or codeword, such as slice_pic_order_cnt_lsb, that are used to determine POC values need to signaled for the random access point picture 12.

Step S10 has been shown as following step S1 in FIG. 11. In alternative approaches, step S10 can be conducted prior to, in parallel with or after step S1 or indeed step S2 of FIG. 11.

In an embodiment, the video stream 1 comprises a picture 22 in an enhancement layer 20 at the same time instance as the random access point picture 12 in the base layer 10. In such a case, the picture 22 in the enhancement layer 20 and the random access point picture 12 in the base layer 10 are regarded as belonging to a same so-called access unit (AU) 30.

Generally, the AU 30 comprising the random access point picture 12 in the base layer 10 could include from 1 up to N pictures 10, 20 for a video stream 1 comprising N layers 10, 20, i.e. the base layer 10 and N−1 enhancement layers 20.

Step S11 of FIG. 12 relates to the case where the AU 30 comprises at least one additional picture 22 in an enhancement layer 20 in addition to the random access point picture 12 in the base layer 10. In such a case, step S11 preferably comprises setting a POC value of a picture 22 in an enhancement layer 20 of the multiple layers 10, 20 and belonging to a same access unit 30 as the random access point picture 12 to 0 (zero).

Thus, step S11 preferably sets the POC value of the enhancement layer picture 22 in the same AU 30 to the same POC value as the random access point picture 12, which POC value is set as discussed above in connection with step S10 of FIG. 12.

However, whereas the random access point picture 12 preferably lacks any syntax element or codeword (slice_pic_order_cnt_lsb) used to define POC values, the picture 22 in the enhancement layer 20 and belonging to the AU 30 preferably has such a syntax element or codeword slice_pic_order_cnt_lsb, for instance present in its slice header. This further means that this syntax element or codeword is preferably not used when determining the POC value to use for the picture 22. In clear contrast, the POC value of the picture 22 is preferably set to 0, i.e. equal to the POC value of the random access point picture 12 of the same AU 30. This means that the video stream 1 will comply to the previously mentioned POC alignment rule. The method then continues to step S2 of FIG. 12 (or indeed to step S1 or ends).

FIG. 13 is a flow chart illustrating an embodiment of the recalculating step in FIG. 11. The method continues from step S1 in FIG. 11 and continues to step S20. This step S20 preferably comprises replacing, for the reference pictures 24 in the DPB of the decoder, a respective original POC value of the reference picture 24 with a respective updated POC value calculated based on the POC recalculation value and the respective original POC value.

Hence, the original POC value of the reference picture, which is typically determined based on the POC lsb value obtained from the syntax element or codeword slice_pic_order_cnt_lsb and the POC msb value obtained from the POC value of a previous picture and slice_pic_order_cnt_lsb, is preferably replaced by an updated POC value. This updated POC value is further calculated based on the POC recalculation value as retrieved in step S1 of FIG. 11 and the original POC value of the particular reference picture 24.

In a particular embodiment, step S20 preferably comprises replacing, for each reference picture 24 in the DPB of the decoder, the respective original POC value of the reference picture 24 with the respective updated POC value calculated based on the POC recalculation value and the respective original POC value.

Thus, in this particular embodiment, the replacement of POC values in step S20 is performed for reference pictures 24 for all the layers 10, 20 in the DPB.

In other embodiments, the replacement of POC values in step S20 does not necessarily have to be performed for all reference pictures 24 stored in the DPB. For instance, the replacement of POC values could be performed for those reference pictures 24 stored in the DPB that belongs to the current layer 10, i.e. base layer 10, or belongs to a layer 20 that depends on the current layer 10, i.e. an enhancement layer 20 that comprises pictures 22, 24 that are decoded by reference to pictures 12, 14 in the base layer 10.

In a particular embodiment, a POC decrement value is derived using the POC recalculation value retrieved in step S1 of FIG. 11. In such a case, replacing the original POC value in step S20 preferably comprises replacing, for the reference pictures 24 in the DPB of the decoder, the respective original POC value of the reference picture 24 with a respective updated POC value calculated as the respective original POC value decremented by the POC decrement value.

This means that updated POC value=original POC value−POC decrement value in a preferred embodiment. In addition, POC decrement value=function (POC recalculation value), i.e. the POC decrement value is preferably derived from the POC recalculation value.

In a particular embodiment, the POC recalculation value is signaled, such as in the slice header of the IDR picture 12 in the base layer 10, with a fix length code using the same number of bits as slice_pic_order_cnt_lsb. In such a case, the POC recalculation value could represent the least significant bits of the POC decrement value. The most significant bits of the POC decrement value could then be obtained using a universal variable length codeword (UVLC).

In a particular embodiment, the method continues from step S1 in FIG. 11 and continues to step S30 of FIG. 14. In this embodiment, a POC decrement value is derived in step S30 in a POC derivation process as if the random access point picture 12 is a non-random access point picture using the POC recalculation value as the least significant bits of the POC decrement value. The method then continues to step S20 of FIG. 13. In such a case, step S20 comprises replacing, for the reference pictures 24 in the DPB of the decoder, the respective original POC value of the reference picture 24 with a respective updated POC value calculated as the respective POC original value decremented by the POC decrement value.

The POC derivation process is the process discussed in the foregoing, where the POC value of a non-random access point picture is obtained by setting the least significant bits of the POC value (POC lsb) to the value represented by a syntax element or codeword (slice_pic_order_cnt_lsb) and by determining the most significant bits of the POC value (POC msb) based on the POC value of a previous picture and POC lsb.

This means that the POC decrement value is preferably derived in step S30 by setting the least significant bits of the POC decrement value to the POC recalculation value and by determining the most significant bits of the POC decrement value based on the POC value of a previous picture 14 and the POC recalculation value.

In a particular embodiment, the equation 8-1 in section 8.3.1 of [1] is used to calculate the most significant bits of the POC decrement value but with the difference that slice_pic_order_cnt_lsb is replaced by the POC recalculation value.

This means that in an embodiment the parameter pocLsbDelta=poc_lsb_val, wherein pocLsbDelta represents the least significant bits of the POC decrement value DeltaPocVal and poc_lsb_val represents the POC recalculation value. The parameter pocMsbDelta, which represents the most significant bits of the POC decrement value, is preferably a function of pocLsbDelta, prevPicOrderCntLsb and prevPicOrderCntMsb, wherein prevPicOrderCntLsb and prevPicOrderCntMsb represent the least and most significant bits of the POC value of the previous picture.

In a particular embodiment pocMsbDelta is derived as follows:

--- if( (pocLsbDelta < prevPicOrderCntLsb ) && ( ( prevPicOrderCntLsb − pocLsbDelta) >= (MaxPicOrderCntLsb / 2 )))
   PicOrderCntMsb = prevPicOrderCntMsb + MaxPicOrderCntLsb -continued

```
else if( (pocLsbDelta > prevPicOrderCntLsb ) && ( (pocLsbDelta –
prevPicOrderCntLsb ) > (MaxPicOrderCntLsb / 2 )))
    PicOrderCntMsb = prevPicOrderCntMsb – MaxPicOrderCntLsb
else
    PicOrderCntMsb = prevPicOrderCntMsb
``` wherein MaxPicOrderCntLsb represents the largest value of the least significant bits of a POC value and MaxPicOrderCntLsb=$2^{(log\_2\_max\_pic\_order\_cnt\_lsb\_minus4+4)}$ with the syntax element or codeword log_2_max_pic_order_cnt_lsb_minus4 specifying the value of the variable MaxPicOrderCntLsb that is used in the decoding process for picture order count.

In such a case, the POC decrement value is simply obtained as DeltaPocVal=pocMsbDelta+pocLsbDelta.

The POC value (PicOrderCntVal) of each picture that is in the DPB and is used as reference picture as defined herein is then decremented by DeltaPocVal.

In another embodiment, the determination of the most significant bits of the POC decrement value is made dependent on a codeword or flag in the bitstream, such as in the slice header of the random access point picture. This flag could be the so called poc_msb_val_present_flag, which when set (1) defines that the slice header of the random access point picture in the base layer comprises a codeword poc_msb_val defining the most significant bits of the POC decrement value. Hence, in such a case no POC derivation process needs to be performed since the most significant bits of the POC decrement value are signaled using as an UVLC codeword, preferably in the slice header of the random access point picture in the base layer.

In this embodiment, the most significant bits of the POC decrement value, pocMsbDelta, are derived as pocMsbDelta=poc_msb_val*MaxPicOrderCntLsb. This operation is basically a bit shift to get the value of poc_msb_val to be present at the most significant bit positions. The decrement value is then calculated as discussed above, i.e. DeltaPocVal=pocMsbDelta+pocLsbDelta.

FIG. 15 is a flow chart illustrating a particular implementation embodiment of step S30 in FIG. 14. The method continues from step S1 in FIG. 11. A next step S40 comprises setting the least significant bits (LSB) of the POC decrement value to the POC recalculation value. A next step S41 comprises determining the most significant bits (MSB) of the POC recalculation value from a POC value of a previous picture 14 of the base layer 10 stored in the DPB and the POC recalculation value.

In an alternative embodiment, step S40 comprises setting the least significant bits (LSB) of the POC decrement value to the POC recalculation value. A next step S41 comprises determining the most significant bits (MSB) of the POC recalculation value from a codeword signaled for the video stream 1. The codeword preferably correspond to the codeword(s) used for calculating the POC of the previous picture and the codeword(s) used for calculating MaxPicOrderCntLsb. Alternatively, the codeword preferably corresponds to the above disclosed poc_msb_val.

Thus, a method in a receiving unit is provided according to an aspect. The receiving unit is also referred to as a decoder which should be interpreted as that the receiving unit comprises a decoder.

FIG. 16 is a flow chart illustrating a corresponding method performed by an encoder. The method comprises calculating a POC recalculation value in step S50 based on a POC value to use for an access unit 30 comprising a random access point picture 12 in a base layer of a video stream 1 comprising pictures 12, 14, 16, 22, 24, 26 in multiple layers 10, 20. A next step S51 comprises generating an encoded representation of the random access point picture 12 comprising the POC recalculation value. POC values of reference pictures 24 in a DPB of the encoder are recalculated in step S52 using the POC recalculation value.

Thus, the encoder used for encoding pictures 10, 20 of the video stream 1 also has access to a DPB and basically, during the encoding process, performs a similar decoding of the encoded pictures as the decoder, which is generally referred to as picture reconstruction at the encoder side. This means that the encoder updates POC values of reference pictures 24 in the DPB in a similar way as the decoder does.

In an embodiment, the method comprises an additional, optional step as shown in FIG. 17. The method then starts by deciding the POC value to use for the access unit 30. The method then continues to step S50 of FIG. 16, where the POC recalculation value is calculated based on this decided POC value.

In an embodiment, the POC value of the access unit is decided in step S60 to comply with the previously mentioned POC range rule and the POC derivation process.

For instance and as shown in FIGS. 5, 6, 8-10, POC values of the access units preferably increase for each time instance, such as 1030, 1032, 1034. In such a case, the POC value of the access unit decided in step S60 could be decided based on the POC value assigned to a previous, preferably the most previous, access unit of the video stream. For instance, $POC_i=POC_{i-1}+n$, wherein $POC_i$ represents the POC value to be decided for the current access unit, $POC_{i-1}$ represents the POC value assigned to the previous access unit and n is a predefined increment value that is an integer equal to or larger than one, such as one or preferably two.

The generation of the encoded representation in step S51 preferably comprises encoding the POC recalculation value in a slice header of the random access point picture 12 in the base layer 10 and more preferably encoding the POC recalculation value in a slice header of an IDR picture 12 in the base layer.

Thus, the POC recalculation value is preferably included as a syntax element or codeword in the slice header, such as in the slice header extension portion of the slice header.

The generation of the encoded representation in step S51 is otherwise performed according to prior art techniques for encoding random access point pictures, such as IDR pictures, but with the important exception of including the POC recalculation value as a syntax element or codeword in the resulting encoded representation, such as in the slice header of the random access point picture.

FIG. 18 is a flow chart of an additional, optional step of the method shown in FIG. 16. The method continues from step S52 in FIG. 16. A next step S70 comprises setting a POC value of the random access point picture 12 to 0 (zero).

In an embodiment, the AU 30 comprises at least one other picture 22 in one or more than one enhancement layer 20 in addition to the random access point picture 12 in the base layer 10. In such a case, the method preferably comprises the additional, optional step S80 as shown in FIG. 19. The method continues from step S52 and comprises setting, in step S80, a POC of all pictures 12, 22 in the AU 30 to 0 (zero).

In an embodiment, recalculating the POC values comprises, as shown in FIG. 20, replacing, in step S90, for the reference pictures 24 in the DPB of the encoder, a respective original POC value of the reference picture 24 with a respective updated POC value calculated based on the POC recalculation value and the respective original POC value.

In another embodiment, step S90 of FIG. 20 comprises replacing, for each picture 24 in the DPB of the encoder, the respective original POC value of the reference picture with the respective updated POC value calculated based on the POC recalculation value and the respective original POC value.

Step S90 of FIG. 20 is basically conducted in a similar way as step S20 of FIG. 13 but with the difference that the operation is now taking place on reference pictures in the DPB of an encoder, whereas FIG. 13 relates to the corresponding operation taking place at the decoder side.

FIG. 21 is a flow chart illustrating a particular embodiment of the calculating step in FIG. 16. The method starts in step S100 where a POC decrement value to use for the AU 30 is decided. A next step S101 comprises setting the POC recalculation value to least significant bits of the POC decrement value. The method then continues to step S90 of FIG. 20, which comprises replacing, for the reference picture 24 in the DPB of the encoder, the respective original POC value of the reference picture with a respective updated POC value calculated as the respective original POC value decremented by the POC decrement value.

The POC decrement value is preferably determined in step S100 to comply with the previously mentioned POC range rule and the POC derivation process.

According to an aspect of the embodiments, a method in a transmitting unit is provided exemplified by an encoder. In the method, the POC to use for the AU 30 is decided, the POC recalculation value is calculated based on the POC to use for the AU 30. The POC recalculation value e.g. in the slice header of the IDR picture 12 is encoded and for each picture 24 in the DPB, replace the original POC value with an updated POC value which is calculated based on the POC recalculation value and the respective original POC value of each picture 24 in the DPB. The method further comprises setting the POC value of all pictures 12, 22 in the AU 20 to 0.

Herein various implementation embodiments will be further described.

Embodiment 1

In one embodiment, the slice header of the base layer is extended for IDR pictures to carry a POC recalculation value D. The value D is present in all IDR pictures of the base layer. Alternatively, the value D may also be present in all IDR pictures of the base layer only if it is signaled that IRAP pictures are not aligned between layers.

The following actions are done by a decoder when receiving an IDR picture in the base layer:
 a. Retrieve the POC recalculation value D from the slice header of the IDR picture in the base layer (Step S1 of FIG. 11).
 b. Set the POC value of the IDR picture in the base layer to 0 (Step S10 of FIG. 12).
 c. For each picture in the DPB, replace the original POC value with an updated POC value which is calculated based on the value D and the respective original POC value of each picture in the DPB. (Step S2 of FIG. 11, step S20 of FIG. 13).

FIG. 22 schematically illustrates updating the POC of the pictures in enhancement layer in the DPBs when a base layer IDR picture is received. This figure shows two pictures in the DPB of the decoder with POC equal to $POC_A$ and $POC_B$ respectively. An IDR picture carrying value D is received by the decoder which updates the POC values of each picture in the DPB.

The following actions are done by an encoder when encoding an access unit where there is an IDR picture in the base layer:
 a. Decide the POC to use for the access unit (Step S60 of FIG. 17).
 b. Calculate the POC recalculation value D based on the POC to use for the access unit (Step S60 of FIG. 16).
 c. Encode the value D in the slice header of the IDR picture (Step S51 of FIG. 16).
 d. For each picture in the DPB, replace the original POC value with an updated POC value which is calculated based on the value D and the respective original POC value of each picture in the DPB (Step S52 of FIG. 16 and step S90 of FIG. 20).
 e. Set the POC value of all pictures in the access unit to 0. (Step S70 of FIG. 18 and step S80 of FIG. 19).

The signaling of POC recalculation value D is preferably done by a variable length code or a fixed length code.

Embodiment 2 (32-Bit D)

Embodiment 1 where the recalculation value is a full-POC decrement value.

The following actions are done by the decoder when receiving an IDR picture 12 in the base layer 10:
 a. Retrieve the POC recalculation value D from the slice header of the IDR picture 12 in the base layer 10.
 b. Set the POC value of the IDR picture 12 in the base layer 10 to 0.
 c. For each picture 14, 16, 24, 26 in the DPB, decrement the POC value of that picture 14, 16, 24, 26 with the value D.

FIG. 23A illustrates the decoder example after step a and FIG. 23B illustrates the decoder example after step c.

The following actions are done by an encoder when encoding an access unit 30 containing a base layer IDR picture 12:
 a. Decide the POC to use for the access unit 30.
 b. Set the recalculation value D to the POC value.
 c. Encode the recalculation value D in the slice header extension of the IDR picture 12.
 d. For each picture 14, 16, 24, 26 in the DPB, decrement the POC value with the value D.
 e. Set the POC value of all pictures 12, 22 in the access unit 30 to 0.

FIG. 24A illustrates an example with a non-aligned IRAP picture 12 in the base layer 10 after step a, b and c. FIG. 24B illustrates an example with a non-aligned IRAP picture 12 in the base layer 10 after step a, b, c, d and e.

Embodiment 3 (POC Derivation for the IDR)

Embodiment 1 where the following actions are done by a decoder when receiving an IDR picture 12 in the base layer 10:
 a. Retrieve the POC recalculation value D from the slice header of the IDR picture 12 in the base layer 10.
 b. Use D as poc_cnt_lsb and perform a POC derivation process as if the picture 12 is a non-IRAP picture. Let P be the resulting POC from this process
 c. Set the POC value of the IDR picture 12 in the base layer 10 to 0
 d. For each picture 14, 16, 24, 26 in the DPB, decrement the POC value with the value P.

FIG. 25A illustrates a decoder example after step b and FIG. 25B illustrates a decoder example after step d.

The following actions are done by an encoder when encoding an access unit 30 containing a base layer IDR picture 12:
   a. Decide the POC P to use for the access unit 30.
   b. Set D to the lsb of the decided POC value P and encode D in the slice header extension of the IDR picture 12.
   c. For each picture 14, 16, 24, 26 in the DPB, decrement the POC value with the decided POC value P.
   d. Set the POC value of all pictures 12, 22 in the access unit 30 to 0.

FIG. 26A is an encoder example after step b and FIG. 26B is an encoder example after step e.

Embodiment 4 (Sending Only the POC lsb)

Embodiment 1 where the POC recalculation value is represented by a POC LSB recalculation value D. It is required that the bitstream generated by an encoder or received by a decoder should conform to the following requirements:
   a. The POC values of current picture and all the short-term reference pictures follow the POC range rule.
   b. The POC values of all pictures in the DPB after POC recalculation when receiving an access unit with a base layer IDR picture must be negative. In other words, there cannot be any enhancement layer picture that precedes the IDR access unit in decoding order that is output after the IDR access unit.

The following actions are done by the decoder when receiving an IDR picture 12 in the base layer 10:
   a. Derive the POC recalculation value D from the slice header extension of the IDR picture 12 in the base layer 10.
   b. Set the POC value of the IDR picture 12 in the base layer 10 to 0
   c. For each picture 14, 16, 24, 26 in the DPB, first add D to the original POC value and then set the POC msb value to −1.

FIG. 27A illustrates an example with a non-aligned IRAP picture 12 in the base layer 10 after step a, FIG. 27B illustrates an example with a non-aligned IRAP picture 12 in the base layer 10 after step b and adding D and FIG. 27C illustrates an example with a non-aligned IRAP picture 12 in the base layer 10 after step c.

The following actions are done by an encoder when encoding an access unit containing a base layer IDR picture 12:
   a. Decide the POC to use for the access unit 30.
   b. Set the recalculation value D to MaxPicOrderCntLsb minus the lsb of the decided POC.
   c. Encode the recalculation value D in the slice header extension of the IDR picture 12.
   d. For each picture 14, 16, 24, 26 in the DPB, first add D to the POC value and then set the POC msb to −1.
   e. Set the POC value of all pictures 12 in the access unit 30 to 0.

Embodiment 5 (Signaling of D)

Any of the previous embodiments where the signaling of recalculation value D in slice header is done by any of the following:
   a. Use fixed length of bits for signaling:
      I. The length takes value of 32 (Embodiment 2).
      II. The length has the same value as the length that used for signaling the POC lsb in slice header (Embodiments 3 and 4).
      III. The length is explicitly signaled by using variable length of bits.
   b. Use variable length of bits for signaling, for example by using an Exp-Golomb code.
   c. Use a fix length code with the same number of bits as the poc lsb is signaled with. Signal the number of msb cycles in another UVLC codeword (Embodiment 2).

Embodiment 6 (Conditional Usage of D)

Any of the previous embodiments where the presence (and usage) of recalculation value D in slice header is conditioned on another codeword/flag/syntax element.

The codeword that controls the presence and usage of recalculation value D can be a new codeword, such as idr_recalculation_value_present_flag, or an existing codeword, such as cross_layer_irap_aligned_flag. When the codeword indicates that D is not present the recalculation value D is inferred to be equal to 0.

Embodiment 7 (Restrictions)

Another solution to the problems is to impose a set of restrictions on poc_reset_flag. The restrictions can be formulated like this in the SHVC specification:
   a. poc_reset_flag shall be 1 for all video coding layer (VLC) NAL units in an access unit for which layer_id is larger than 0 when there is an IDR NAL unit, e.g. IDR_W_RADL or IDR_N_LP, in that access unit with layer_id equal to 0.
   b. otherwise, poc_reset_flag shall be equal to 0

FIG. 28 illustrates an example of this embodiment.

The following actions are done by the decoder when a picture 22 of an enhancement layer 20 is received:
   a. If there is an access unit 30 with an IDR picture 12 in the base layer 10 and there is a picture for all layers 20 that depend on the base layer 10, the POC of all pictures 14, 16, 26 in the DPB are decremented by the derived POC value from using poc_reset_flag as specified in [2].
   b. If there is an access unit 30 with an IDR picture 12 in the base layer 10 and there is a picture in at least one layer 20 that depend on the base layer 10, the POC of all pictures 14, 16, 26 in the DPB of all layers 10, 20 are decremented by the derived POC value from using poc_reset_flag as specified in [2]. This is possible since the derived POC value (the decrement value) is guaranteed to be the same in all layers 10, 20. Note that the derived POC value can be applied also to layers for which there is no picture in the IDR access unit 30.

An encoder may use this embodiment by setting poc_reset_flag to 1 for all VLC NAL units in an access unit for which layer_id is larger than 0 when there is an IDR NAL unit, e.g. IDR_W_RADL or IDR_N_LP, in that access unit with layer_id equal to 0. For all other VLC NAL units, poc_reset_flag is set to 0.

Besides the restriction on poc_reset_flag as described above, the encoder is enforced to make sure that there is a temporal layer 0 picture representation in all layers when the base layer is an IDR picture.

These restrictions would prohibit and therefore solve the non-existing and temporal layer problems above. The error resilience problem is not fully solved but the limited encoder flexibility is helpful for a decoder when a picture is lost and the decoder has to deduce how the DPB POC values should be updated.

Embodiment 8 (Example Implementation of the Idea into the Current HEVC Draft)

Here the black text is unchanged from [2], text within the double stars (**) are proposed deletions, and italicized text is proposed additions.

F.7.3.6.1 General Slice Segment Header Syntax

| slice_segment_header( ) { | Descriptor |
|---|---|
| ... | |
| **if( num_extra_slice_header_bits > i ) { | |
|   i++ | |
|   poc_reset_flag | u(1) |
| }** | |
| ... | |
| slice_segment_header_extension_length | ue(v) |
| for( i = 0; i < slice_segment_header_extension_length; i++ ) { | |
|   *if( i == 0 && nuh_layer_id == 0 &&* | |
|     *cross_layer_irap_aligned_flag == 0 &&* | |
|     *(nal_unit_type == IDR_W_RADL ||* | |
|     *nal_unit_type == IDR_N_LP)) {* | |
|     *poc_decrement* | u(32) |
|     *i += 4* | |
|   *} else {* | |
|     slice_segment_header_extension_data_byte[ i ] | u(8) |
|   *}* | |
|   } | |
| } | |
| byte_alignment( ) | |
| } | |

7.4.7.1 General Slice Segment Header Semantics

. . . .

slice_segment_header_extension_length specifies the length of the slice segment header extension data in bytes, not including the bits used for signalling slice_segment_header_extension_length itself. It is a requirement of bitstream conformance that slice_segment_header_extension_length shall be equal to or greater than 4 for IDR_W_RADL and IDR_N_LP NAL units when nuh_layer_id and cross_layer_irap_aligned_flag are both equal to 0. The value of slice_segment_header_extension_length shall be in the range of 0 to 256, inclusive.

*poc_decrement specifies a picture order count decrement to be used for the current picture. When not present, the value of poc_decrement is inferred to be equal to 0.* poc_reset_flag equal to 1 specifies that the derived picture order count for the current picture is equal to 0. poc_reset_equal to 0 specifies that the derived picture order count for the current picture may or may not be equal to 0. It is a requirement of bitstream conformance that when cross_layer_irap_aligned_flag is equal to 1, the value of poc_reset_flag be equal to 0. When not present, the value of poc_reset_flag is inferred to be equal to 0.

F.8.3.1 Decoding Process for Picture Order Count

Output of this process is PicOrderCntVal, the picture order count of the current picture.

. . . .

**When poc_reset_flag is equal to 1, the following steps apply in the order listed:

The PicOrderCntVal of each picture that is in the DPB and belongs to the same layer as the current picture is decremented by PicOrderCntVal.

PicOrderCntVal is set equal to 0.**

*The PicOrderCntVal of each picture that is in the DPB is decremented by poc_decrement.*

The following actions are done by the decoder when receiving an IDR picture 12, in the base layer 10:

a. Derive the POC decrement value D from the slice header extension of the IDR picture 12 in the base layer 10.

b. Set the POC value of the IDR picture 12 in the base layer 10 to 0.

c. For each picture 14, 16, 24, 26 in the DPB, replace the original POC value with an updated POC value which is derived by setting the POC msb of the original POC value to −1.

d. Add the value D to the updated POC values of each picture 14, 16, 24, 26 in the DPB.

FIG. 42A illustrates an example with a non-aligned IRAP picture 12 in the base layer 10 after step b, FIG. 42B illustrates an example with a non-aligned IRAP picture 12 in the base layer 10 after step c (after setting msb to −1) and FIG. 42C illustrates an example with a non-aligned IRAP picture 12 in the base layer 10 after step d.

The following actions are done by an encoder when encoding an access unit 30 containing a base layer IDR picture 12:

a. Decide the POC to use for the access unit 30.

b. Set the decrement value D to MaxPicOrderCntLsb minus the lsb of the decided POC.

c. Encode the decrement value D in the slice header extension of the IDR picture 12.

d. For each picture 14, 16, 24, 26 in the DPB, first set the POC msb to −1 and then add D to the POC value.

e. For each enhancement layer picture in the access unit 30, use the decided POC to signal the POC lsb value of the pictures (to signal slice_pic_order_cnt_lsb for HEVC).

f. Set the POC value of all pictures 12 in the access unit 30 to 0.

Embodiment 9

Figure 43:
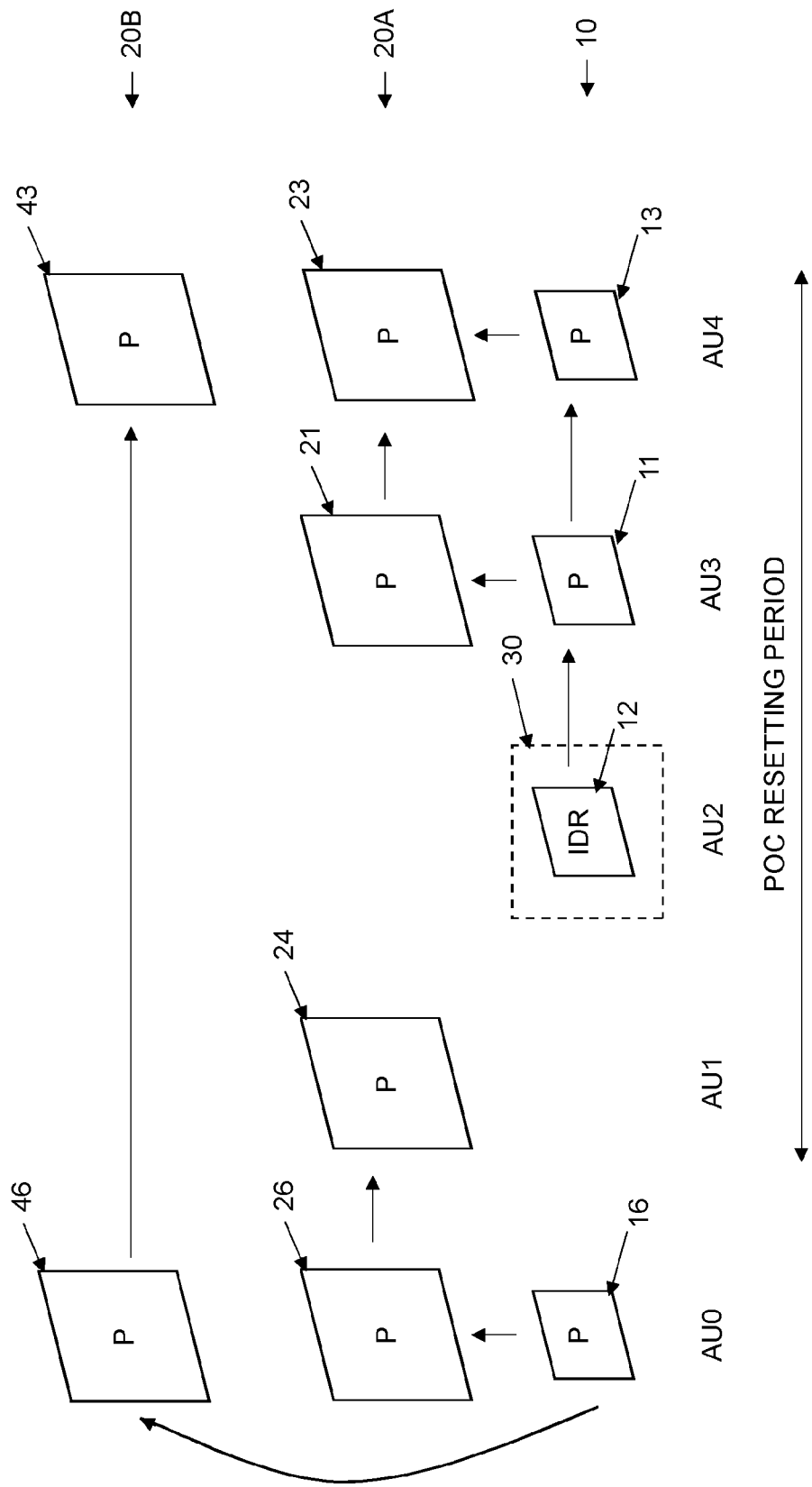
FIG. 43 is an example of a non-aligned IRAP picture in the base layer.

FIG. 43 illustrates a portion of a video stream consisting of three layers and five access units 30 (AU0-AU4). In the illustrative example, pictures 21, 23, 26 in layer 1 20A are dependent on pictures 16, 11, 13 in the base layer 10 (layer 0) and pictures 43, 46 in layer 2 20B are also dependent on pictures 16 in the base layer 10 but not in layer 1 20A.

In this example, AU1 contains POC resetting syntax represented by the codewords poc_reset_idc and poc_reset_period_id, implying that the POC values of the pictures in layer 1 20A. This will start a so-called POC resetting period as shown in FIG. 43. In AU 2 30 there is an IDR 12 in the base layer 10 with poc_reset_idc=3. This will reset the POC values of the layer 2 20B pictures 46 in the DPB. Then in AU 3, the POC values of layer 1 will be reset again based on the codewords mentioned above. Finally, there is a layer 2 picture 43 in AU 4 that refers to the AU 0 picture 46. In order for this picture 43 to do this, the layer 2 picture POC needs to have been reset by the IDR picture 30 in AU 2.

Another aspect of the embodiments relates to a decoder 100, see FIG. 30, configured to retrieve a POC recalculation value from an encoded representation of a random access point picture 12 in a base layer 10 of a video stream 1 comprising pictures 12, 14, 16, 22, 24, 26 in multiple layers 10, 20. The decoder 100 is also configured to recalculate the POC values of reference pictures 24 in a DPB 110 of the decoder 100 using the POC recalculation value.

In an embodiment, the decoder 100 is preferably configured to retrieve the POC recalculation value from a slice header of an IDR picture 12 in the base layer 10.

In an embodiment, the decoder 100 is preferably configured to set a POC value of the random access point picture 12 in the base layer to 0.

In an embodiment, the decoder 100 is preferably configured to set a POC value of a picture 22 in an enhancement layer 20 of the multiple layers 10, 20 and belonging to a same AU 30 as the random access point picture 12 to 0.

In an embodiment, the decoder 100 is preferably configured to replace, for the reference pictures 24 in the DPB 110 of the decoder 100, a respective original POC value of the reference picture 24 with a respective updated POC value calculated based on the POC recalculation value and the respective original POC value.

In an embodiment, the decoder 100 is preferably configured to replace, for each reference picture 24 in the DPB 110 of the decoder 100, the respective original POC value of the reference picture 24 with the respective updated POC value calculated based on the POC recalculation value and the respective original POC value.

In an embodiment, the decoder 100 is preferably configured to derive a POC decrement value in a POC derivation process as if the random access point picture 12 is a non-random access point picture using the POC recalculation value as least significant bits of the POC decrement value. The decoder 100 is in this embodiment preferably also configured to replace, for the reference pictures 24 in the DPB 110 of the decoder 100, the respective original POC value of the reference picture 24 with a respective updated POC value calculated as the respective original POC value decremented by the POC decrement value.

In an embodiment, the decoder 100 is preferably configured to set the least significant bits of the POC decrement value to the POC recalculation value. The decoder 100 is in this embodiment preferably also configured to determine most significant bits of the POC decrement value from a POC value of a previous picture 14 of the base layer 10 stored in the DPB 110 and the POC recalculation value.

In an embodiment, the decoder 100 is preferably configured to set the least significant bits of the POC decrement value to the POC recalculation value. The decoder 100 is in this embodiment preferably also configured to determine most significant bits of the POC decrement value from a codeword signaled for the video stream 1.

It will be appreciated that the methods and devices described herein can be combined and re-arranged in a variety of ways.

For example, embodiments may be implemented in hardware, or in software for execution by suitable processing circuitry, or a combination thereof.

The steps, functions, procedures, modules and/or blocks described herein may be implemented in hardware using any conventional technology, such as discrete circuit or integrated circuit technology, including both general-purpose electronic circuitry and application-specific circuitry.

Particular examples include one or more suitably configured digital signal processors and other known electronic circuits, e.g. discrete logic gates interconnected to perform a specialized function, or Application Specific Integrated Circuits (ASICs).

Figure 32:
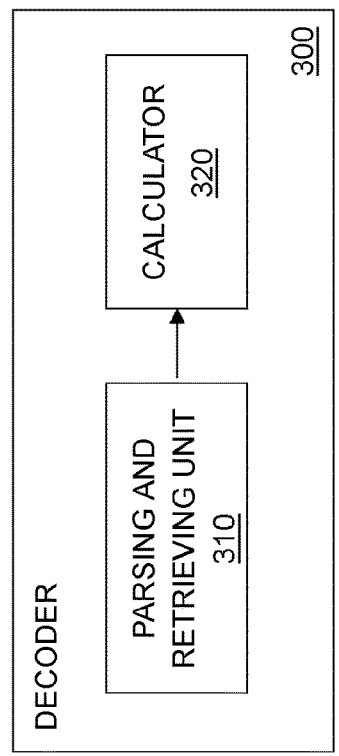
FIG. 32 illustrates a further embodiment of a decoder.

FIG. 32 is a schematic block diagram of a hardware implementation of a decoder 300 according to an embodiment. The decoder 300 comprises a parsing and retrieving unit 310 configured to retrieve the POC recalculation value. The decoder 300 also comprises a calculator 320 configured to recalculate the POC value.

The parsing and retrieving unit 310 is preferably interconnected to the calculator 320 to forward the POC recalculation value retrieved by the parsing and retrieving unit 310 to the calculator 320 for use in the recalculation of POC values.

Alternatively, at least some of the steps, functions, procedures, modules and/or blocks described herein may be implemented in software such as a computer program for execution by suitable processing circuitry such as one or more processors or processing units.

Examples of processing circuitry includes, but is not limited to, one or more microprocessors, one or more Digital Signal Processors (DSPs), one or more Central Processing Units (CPUs), video acceleration hardware, and/or any suitable programmable logic circuitry such as one or more Field Programmable Gate Arrays (FPGAs), or one or more Programmable Logic Controllers (PLCs).

It should also be understood that it may be possible to re-use the general processing capabilities of any conventional device or unit in which the proposed technology is implemented. It may also be possible to re-use existing software, e.g. by reprogramming of the existing software or by adding new software components.

Figure 31:
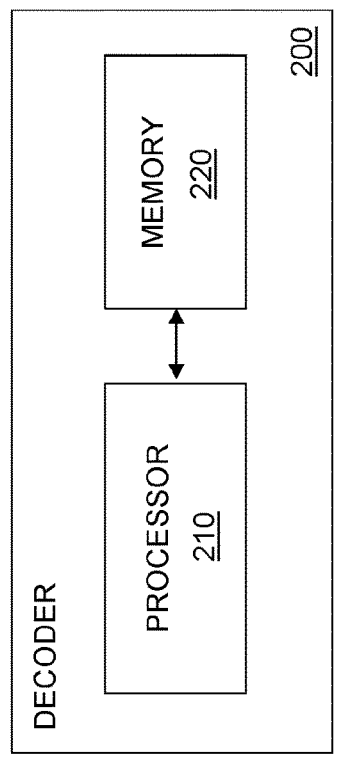
FIG. 31 illustrates another embodiment of a decoder.

In a particular example, the decoder 200 comprises a processor 210 and a memory 220 as shown in FIG. 31. The memory 220 comprises instructions executable by the processor 210, whereby the processor 210 is operative to retrieve the POC recalculation value. The processor 210 is also operative to recalculate the POC values.

The memory 220 as shown in FIG. 31 preferably comprises the DPB of the decoder 200.

Figure 40:
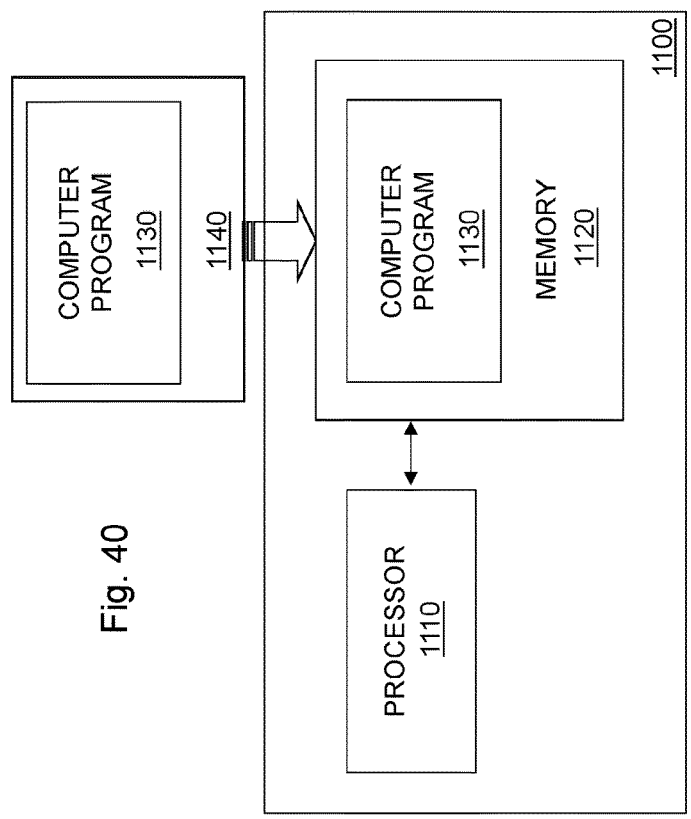
FIG. 40 illustrates a user terminal (UE) according to an embodiment together with a computer program product and computer program according to an embodiment.

FIG. 40 is a schematic block diagram illustrating an example of a user terminal 1100 comprising a processor 1110 and an associated memory 1120.

In this particular example, at least some of the steps, functions, procedures, modules and/or blocks described herein are implemented in a computer program 1130, which is loaded into the memory 1120 for execution by processing circuitry including the processor 1110. The processor 1110 and memory 1120 are interconnected to each other to enable normal software execution. An optional input/output device may also be interconnected to the processor 1110 and/or the memory 1120 to enable input and/or output of relevant data, such as input of encoded representation of video stream and/or output of decoded pictures.

The term 'processor' should be interpreted in a general sense as any system or device capable of executing program code or computer program instructions to perform a particular processing, determining or computing task.

The processing circuitry including one or more processors is thus configured to perform, when executing the computer program, well-defined processing tasks such as those described herein.

The processor does not have to be dedicated to only execute the above-described steps, functions, procedure and/or blocks, but may also execute other tasks.

In a particular embodiment, the computer program 1130 comprises instructions, which when executed by at least one processor 1110, cause the at least one processor 1110 to retrieve a POC recalculation value from an encoded representation of a random access point picture in a base layer of a video stream comprising pictures in multiple layers. The at least one processor 1110 is also caused to recalculate POC values of reference pictures in a DPB using the POC recalculation value.

The proposed technology also provides a carrier 1140 comprising the computer program 1130, wherein the carrier is one of an electronic signal, an optical signal, an electromagnetic signal, a magnetic signal, an electric signal, a radio signal, a microwave signal, or a computer-readable storage medium.

By way of example, the software or computer program may be realized as a computer program product, which is normally carried or stored on a computer-readable medium, in particular a non-volatile medium. The computer-readable medium may include one or more removable or non-removable memory devices including, but not limited to a Read-Only Memory (ROM), a Random Access Memory (RAM), a Compact Disc (CD), a Digital Versatile Disc (DVD), a Blu-ray disc, a Universal Serial Bus (USB) memory, a Hard Disk Drive (HDD) storage device, a flash memory, a magnetic tape, or any other conventional memory device. The computer program may thus be loaded into the operating memory of a computer or equivalent processing device for execution by the processing circuitry thereof.

The flow diagram or diagrams presented herein may therefore be regarded as a computer flow diagram or diagrams, when performed by one or more processors. A corresponding decoder 400, see FIG. 33, may be defined as a group of function modules 410, 420, where each step performed by the processor corresponds to a function module 410, 420. In this case, the function modules 410, 420 are implemented as a computer program running on the processor. Hence, the decoder 400 may alternatively be defined as a group of function modules 410, 420, where the function modules are implemented as a computer program running on at least one processor.

The computer program residing in memory may thus be organized as appropriate function modules 410, 420 configured to perform, when executed by the processor, at least part of the steps and/or tasks described herein. An example of such function modules is illustrated in FIG. 33.

Figure 33:
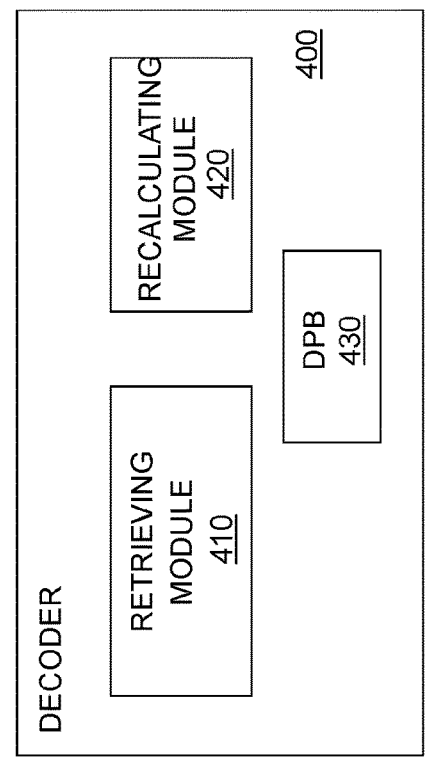
FIG. 33 illustrates yet another embodiment of a decoder.

The decoder 400 of FIG. 33 comprises a retrieving module 410 for retrieving a POC recalculation value from an encoded representation of a random access point picture in a base layer of a video stream comprising pictures in multiple layers. The decoder 400 also comprises a recalculating module for recalculating POC values of reference pictures in a DPB 430 of the decoder 400 using the POC recalculation value.

According to an aspect a receiving unit is provided exemplified by a decoder. The receiving unit comprises a decoding unit for retrieving the POC recalculation value from the slice header of the IDR picture in the base layer, a POC setting unit for setting the POC value of the IDR picture in the base layer to 0 and a POC determining unit that for each picture in the DPB is configured to replace the original POC value with an updated POC value which is calculated based on the POC recalculation value and the respective original POC value of each picture in the DPB.

The decoded picture buffer (DPB) in HEVC is a buffer holding decoded pictures for reference, output reordering, or output delay. The pictures can be identified by its POC value. However also the encoder has a copy of the DPB.

Figure 34:
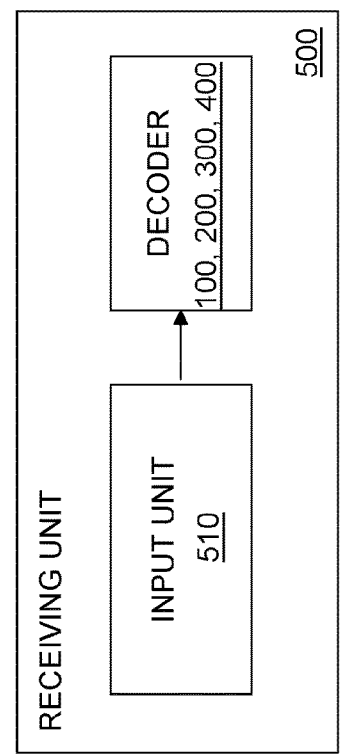
FIG. 34 illustrates an embodiment of a receiving unit.

FIG. 34 is an illustration of a receiving unit 500 comprising an input unit 510 configured to receive a bitstream and a decoder 100, 200, 300, 400 according to any of the previously described embodiments.

Thus, the input unit 510 receives a bitstream comprising encoded representations of pictures of the video stream and forwards them to the decoder for decoding a POC recalculation as described herein.

The input unit 510 could be implemented as a receiver or transceiver for wireless reception of the bitstream. Alternatively, the input unit 510 could be implemented as a communication port, such as input port, for wired reception of the bitstream.

A further aspect of the embodiments relates to an encoder 600, see FIG. 35. The encoder 600 is configured to calculate a POC recalculation value based on a POC value to use for an AU 30 comprising a random access point picture 12 in a base layer 10 of a video stream 1 comprising pictures 12, 14, 16, 22, 24, 26 in multiple layers 10, 20. The encoder 600 is also configured to generate an encoded representation of the random access point picture 12 comprising the POC recalculation value. The encoder 600 is further configured to recalculate POC values of reference pictures 24 in a DPB 610 of the encoder using the POC recalculation value.

In an embodiment, the encoder 600 is preferably configured to decide the POC value to use for the AU 30.

In an embodiment, the encoder 600 is preferably configured to encode the POC recalculation value in a slice of an IDR picture 12 in the base layer 10.

In an embodiment, the encoder 600 is preferably configured to set a POC value of the random access point picture 12 to 0.

In an embodiment, the encoder 600 is preferably configured to set a POC value of all pictures 12, 22 in the AU 30 to 0.

In an embodiment, the encoder 600 is configured to replace, for the reference pictures 24 in the DPB 610 of the encoder 600, a respective original POC value of the reference picture 24 with a respective updated POC value calculated based on the POC recalculation value and the respective original POC value.

In an embodiment, the encoder 600 is configured to replace, for each reference picture 24 in the DPB 610 of the encoder 600, a respective original POC value of the reference picture 24 with a respective updated POC value calculated based on the POC recalculation value and the respective original POC value.

In an embodiment, the encoder 600 is configured to decide a POC decrement value to use for the AU 30. The encoder 600 is also configured, in this embodiment, to set the POC recalculation value to least significant bits of the POC decrement value and replace, for the reference pictures 24 in the DPB 610 of the encoder 600, the respective original POC value of the reference picture 24 with a respective updated POC value calculated as the respective original POC value decremented by the POC decrement value.

FIG. 37 is a schematic block diagram of a hardware implementation of an encoder 800 according to an embodiment. The encoder 800 comprises calculator 810 configured to calculate the POC recalculation value. The encoder 800 also comprises an encoding unit 820 configured to generate the encoded representation and a recalculator 830 configured to recalculate the POC values.

The calculator 810 is preferably connected to the encoding unit 820 and the recalculator 830 for forwarding the POC recalculation value to these units 820, 830.

In a particular example, the encoder 700 comprises a processor 710 and a memory 720 as shown in FIG. 36. The memory 720 comprises instructions executable by the processor 710, whereby the processor 710 is operative to calculate the POC recalculation value, generate the encoded representation and recalculate the POC values.

The memory 720 as shown in FIG. 36 preferably comprises the DPB of the encoder 700.

In a particular embodiment, the computer program 1130 as shown in FIG. 40 comprises instructions, which when executed by at least one processor 1110, cause the at least one processor 1110 to calculate a POC recalculation value based on POC value to use for an AU compressing a random access point picture in a base layer of a video stream comprising pictures in multiple layers. The at least one processor 1110 is also caused to generate an encoded representation of the random access point picture comprising the POC recalculation value. The at least one processor 1110 is further configured to recalculate POC value of reference pictures in a DPB using the POC recalculation value.

The computer program residing in memory may thus be organized as appropriate function modules 910, 92, 930 configured to perform, when executed by the processor, at least part of the steps and/or tasks described herein. An example of such function modules is illustrated in FIG. 38.

The encoder 900 of FIG. 38 comprises a calculating module 910 for calculating a POC recalculation value based on POC value to use for an AU compressing a random access point picture in a base layer of a video stream comprising pictures in multiple layers. The encoder 900 also comprises a generating module 920 for generating an encoded representation of the random access point picture comprising the POC recalculation value. The encoder 900 further comprises a recalculating module 930 for recalculating POC value of reference pictures in a DPB 940 using the POC recalculation value.

According to an aspect a transmitting unit exemplified by an encoder is provided. The encoder comprises a POC deciding unit configured to decide the POC to use for the access unit, a POC recalculation value calculation unit configured to calculate the POC recalculation value based on the POC to use for the access unit. It further comprises an encoding unit for encoding the POC recalculation value e.g. in the slice header of the IDR picture and a POC updating unit configured to for each picture in the DPB, replace the original POC value with an updated POC value which is calculated based on the POC recalculation value and the respective original POC value of each picture in the DPB and to set the POC value of all pictures in the access unit to 0.

FIG. 39 illustrates an embodiment of a transmitting unit 1000 comprising an encoder 600, 700, 800. 900 according to any of the embodiments described herein and an output unit 1010 configured to send a bitstream.

Hence, the encoder 600, 700, 800, 900 encodes pictures of a video stream to generate encoded representations of the pictures forming the bitstream that is sent by the output unit 1010.

The output unit 1010 could be implemented as a transmitter or transceiver for wireless transmission of the bitstream. Alternatively, the output unit 1010 could be implemented as a communication port, such as output port, for wired transmission of the bitstream.

The transmitting and/or the receiving units can be implemented in a video camera or in any other device. The transmitting and/or the receiving units can also be implemented in network nodes. The encoder and the decoder, respectively, may be implemented by a computer comprising a processor and a memory. Respective memory contains instructions executable by said processor whereby said encoder is operative to perform the method disclosed herein and the decoder is operative to perform the method disclosed herein. The embodiments improve the support for POC alignment when IRAP pictures are not aligned in scalable video coding. It enables more encoder side flexibility and solves the error resilience problem, non-existing picture, and temporal layer problems comparing to the existing solution.

Figure 41:
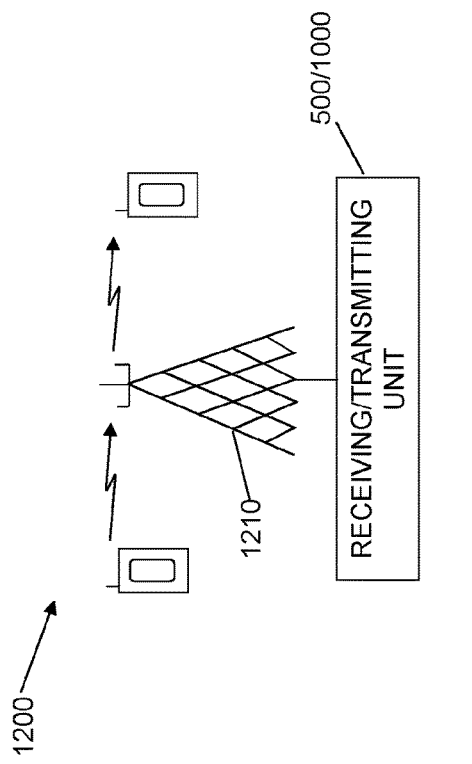
FIG. 41 illustrates a network node according to an embodiment.

FIG. 41 schematically illustrates a communication network 1200 comprising a network node 1210, such as exemplified by a radio base station, Node E or other network node type, comprising a receiving unit 500 and/or a transmitting unit 1000 according to the embodiments.

The delta POC information is currently sent in the enhancement layer picture. It is very important for a decoder to receive the IDR picture, without it the decoder is completely lost since it will not be able to decode any layer since they all depend on the IDR. If the enhancement layer picture is lost, the decoder can continue decoding the base layer. It will be lower quality but not a disaster. It can therefore be assumed that the IDR picture is better protected than any other picture.

By signaling a POC decrement value in the base layer IDR picture, we move the information about how to recalculate POC values from the less important enhancement layer picture to the IDR picture which we assume to be correctly received.

The embodiments described above are to be understood as a few illustrative examples of the present invention. It will be understood by those skilled in the art that various modifications, combinations and changes may be made to the embodiments without departing from the scope of the present invention. In particular, different part solutions in the different embodiments can be combined in other configurations, where technically possible. The scope of the present invention is, however, defined by the appended claims.

REFERENCES

[1] ITU-T, Telecommunication Standardization Sector of ITU, Series H: Audiovisual and multimedia systems, H.265, Infrastructure of audiovisual services—Coding of moving video, High efficiency video coding, April 2013
[2] Joint Collaborative Team on Video Coding (JCT-VC) of ITU-T SG 16 WP 3 and ISO/IEC JTC 1/SC 29/WG 11, 14$^{th}$ Meeting: Vienna, AT, 25 Jul.-2 Aug. 2013, High efficiency video coding (HEVC) scalable extension draft 3, JCTVC-N1008_v3

The invention claimed is:

1. A method performed by a decoder, said method comprising:
    retrieving a picture order count, POC, recalculation value from an encoded representation of an instantaneous decoding refresh, IDR, picture in a base layer of a video stream comprising pictures in multiple layers;
    deriving a POC decrement value using said POC recalculation value as least significant bits or most significant bits of said POC decrement value; and
    recalculating POC values of reference pictures in a decoded picture buffer of said decoder using said POC decrement value, wherein recalculating POC values comprises replacing, for said reference pictures in said decoded picture buffer of said decoder, a respective original POC value of said reference picture with a respective updated POC value calculated as said respective original POC value decremented by said POC decrement value.

2. The method according to claim 1, wherein retrieving said POC recalculation value comprises retrieving said POC recalculation value from a slice header of the IDR picture in said base layer.

3. The method according to claim 1, further comprising setting a POC value of said IDR picture in said base layer to 0.

4. The method according to claim 3, further comprising setting a POC value of a picture in an enhancement layer of said multiple layers and belonging to a same access unit as said random access point picture to 0.

5. The method according to claim 1, wherein deriving said POC decrement value comprises:
  setting said least significant bits of said POC decrement value to said POC recalculation value; and
  determining most significant bits of said POC decrement value from a POC value of a previous picture of said base layer stored in said decoded picture buffer and said POC recalculation value.

6. The method according to claim 1, wherein deriving said POC decrement value comprises:
  setting said least significant bits of said POC decrement value to said POC recalculation value; and
  determining most significant bits of said POC decrement value from a codeword signaled for said video stream.

7. A method performed by an encoder, said method comprising:
  calculating a picture order count, POC, recalculation value based on a POC value to use for an access unit comprising an instantaneous decoding refresh, IDR, picture in a base layer of a video stream comprising pictures in multiple layers;
  generating an encoded representation of said IDR picture comprising said POC recalculation value;
  deciding a POC decrement value to use for said access unit;
  setting said POC recalculation value to least significant bits or most significant bits of said POC decrement value; and
  recalculating POC values of reference pictures in a decoded picture buffer of said encoder using said POC decrement value, wherein recalculating POC values comprises replacing, for said reference pictures in said decoded picture buffer of said encoder, a respective original POC value of said reference picture with a respective updated POC value calculated as said respective original POC value decremented by said POC decrement value.

8. The method according to claim 7, further comprising deciding said POC value to use for said access unit.

9. The method according to claim 7, wherein generating said encoded representation comprises encoding said POC recalculation value in a slice header of the IDR picture in said base layer.

10. The method according to claim 7, further comprising setting a POC value of said random access point picture to 0.

11. The method according to claim 10, wherein setting said POC value comprises setting a POC value of all pictures in said access unit to 0.

12. A decoder, wherein:
  said decoder is configured to retrieve a picture order count, POC, recalculation value from an encoded representation of an instantaneous decoding refresh, IDR, picture in a base layer of a video stream comprising pictures in multiple layers; and
  said decoder is further configured to:
    derive a POC decrement value using said POC recalculation value as least significant bits or most significant bits of said POC decrement value; and
    recalculate POC values of reference pictures in a decoded picture buffer of said decoder using said POC decrement value, wherein recalculating POC values comprises replacing, for said reference pictures in said decoded picture buffer of said decoder, a respective original POC value of said reference picture with a respective updated POC value calculated as said respective original POC value decremented by said POC decrement value.

13. The decoder according to claim 12, wherein said decoder is configured to retrieve said POC recalculation value from a slice header of the IDR picture in said base layer.

14. The decoder according to claim 12, wherein said decoder is configured to set a POC value of said IDR picture in said base layer to 0.

15. The decoder according to claim 14, wherein said decoder is configured to set a POC value of a picture in an enhancement layer of said multiple layers and belonging to a same access unit as said IDR picture to 0.

16. The decoder according to claim 12, wherein:
  said decoder is configured to set said least significant bits of said POC decrement value to said POC recalculation value; and
  said decoder is configured to determine most significant bits of said POC decrement value from a POC value of a previous picture of said base layer stored in said decoded picture buffer and said POC recalculation value.

17. The decoder according to claim 12, wherein
  said decoder is configured to set said least significant bits of said POC decrement value to said POC recalculation value; and
  said decoder is configured to determine most significant bits of said POC decrement value from a codeword signaled for said video stream.

18. The decoder according to claim 12, further comprising:
  a processor; and
  a memory, said memory containing instructions executable by said processor, wherein:
  said processor is operative to retrieve said POC recalculation value; and
  said processor is operative to recalculate said POC values.

19. A receiving device comprising:
  a receiver configured to receive a bitstream; and
  a decoder according to claim 12.

20. An encoder, wherein:
  said encoder is configured to:
    calculate a picture order count, POC, recalculation value based on a POC value to use for an access unit comprising an instantaneous decoding refresh, IDR, picture in a base layer of a video stream comprising pictures in multiple layers;
    generate an encoded representation of said IDR picture comprising said POC recalculation value;
    decide POC decrement value for use for said access unit;
    set said POC recalculation value to least significant or most significant bits of said POC decrement value; and
    recalculate POC values of reference pictures in a decoded picture buffer of said encoder using said POC decrement value, wherein the encoder is configured to recalculate the POC values by replacing, for said reference pictures in said decoded picture buffer of said encoder, a respective original POC value of said reference picture with a respective updated POC value calculated as said respective original POC value decremented by said POC decrement value.

21. The encoder according to claim 20, wherein said encoder is configured to decide said POC value to use for said access unit.

22. The encoder according to claim 20, wherein said encoder is configured to encode said POC recalculation value in a slice header of the IDR picture in said base layer.

23. The encoder according to claim 20, wherein said encoder is configured to set a POC value of said random access point picture to 0.

24. The encoder according to claim 23, wherein said encoder is configured to set a POC value of all pictures in said access unit to 0.

25. The encoder according to claim 20, further comprising:
 a processor; and
 a memory, said memory containing instructions executable by said processor, wherein:
 said processor is operative to calculate said POC decrement value;
 said processor is operative to generate said encoded representation; and
 said processor is operative to recalculate said POC values.

26. A transmitting device comprising:
 an encoder to claim 20; and
 an transmitter configured to send a bitstream.

27. A computer program product comprising a non-transitory computer readable storage medium storing instructions which, when executed on at least one processor, cause said at least one processor to:
 retrieve a picture order count, POC, recalculation value from an encoded representation of an instantaneous decoding refresh, IDR, picture in a base layer of a video stream comprising pictures in multiple layers; and
 derive a POC decrement value using said POC recalculation value as least significant bits or most significant bits of said POC decrement value; and
 recalculate POC values of reference pictures in a decoded picture buffer of said decoder using said POC decrement value, wherein recalculating POC values comprises replacing, for said reference pictures in said decoded picture buffer of said decoder, a respective original POC value of said reference picture with a respective updated POC value calculated as said respective original POC value decremented by said POC decrement value.

28. A computer program product comprising a non-transitory computer readable storage medium storing instructions which, when executed on at least one processor, cause said at least one processor to:
 calculate a picture order count, POC, recalculation value based on a POC value to use for an access unit comprising an instantaneous decoding refresh, IDR, picture in a base layer of a video stream comprising pictures in multiple layers;
 generate an encoded representation of said IDR picture comprising said POC recalculation value;
 decide POC decrement value for use for said access unit;
 set said POC recalculation value to least significant or most significant bits of said POC decrement value; and
 recalculate POC values of reference pictures in a decoded picture buffer of said encoder using said POC decrement value, wherein the encoder is configured to recalculate the POC values by replacing, for said reference pictures in said decoded picture buffer of said encoder, a respective original POC value of said reference picture with a respective updated POC value calculated as said respective original POC value decremented by said POC decrement value.

\* \* \* \* \*

UNITED STATES PATENT AND TRADEMARK OFFICE
CERTIFICATE OF CORRECTION

PATENT NO. : 10,306,245 B2  
APPLICATION NO. : 14/786116  
DATED : May 28, 2019  
INVENTOR(S) : Sjoberg et al.

Page 1 of 1

It is certified that error appears in the above-identified patent and that said Letters Patent is hereby corrected as shown below:

In the Specification

Column 2, Line 54, delete "JOTVC-N1008_v3" and insert -- JCTVC-N1008_v3 --, therefor.

Signed and Sealed this  
Tenth Day of December, 2019

Andrei Iancu  
*Director of the United States Patent and Trademark Office*